(12) United States Patent
Moyer et al.

(10) Patent No.: US 6,174,503 B1
(45) Date of Patent: Jan. 16, 2001

(54) CALIXARENE CROWN ETHER SOLVENT COMPOSITION AND USE THEREOF FOR EXTRACTION OF CESIUM FROM ALKALINE WASTE SOLUTIONS

(75) Inventors: Bruce A. Moyer, Oak Ridge; Richard A. Sachleben; Peter V. Bonnesen, both of Knoxville; Derek J. Presley, Ooltewah, all of TN (US)

(73) Assignee: Lockheed Martin Energy Research Corporation, Oak Ridge, TN (US)

(*) Notice: Under 35 U.S.C. 154(b), the term of this patent shall be extended for 0 days.

(21) Appl. No.: 09/146,800

(22) Filed: Sep. 3, 1998

Related U.S. Application Data
(60) Provisional application No. 60/057,974, filed on Sep. 6, 1997.

(51) Int. Cl.[7] .......................... C22B 26/10; C01B 31/00; C09K 3/00

(52) U.S. Cl. ............................... 423/181; 252/184

(58) Field of Search ..................... 423/181, 2; 252/184; 210/634, 638, 643

(56) References Cited

U.S. PATENT DOCUMENTS

| | | |
|---|---|---|
| 4,647,440 | 3/1987 | Blasius et al. . |
| 5,143,784 | 9/1992 | Mita . |
| 5,210,216 | 5/1993 | Harris et al. . |
| 5,607,591 | 3/1997 | Dozol et al. . |
| 5,622,687 | 4/1997 | Kirshnan et al. . |
| 5,888,398 * | 3/1999 | Dietz et al. ............................. 423/2 |
| 5,926,687 * | 7/1999 | Dozol et al. ............................ 423/9 |

FOREIGN PATENT DOCUMENTS

| | | |
|---|---|---|
| 92/142 45 | 5/1994 | (WO) . |
| WO 94/12502 | 6/1994 | (WO) . |
| 93/045 66 | 10/1994 | (WO) . |
| WO 97/17322 | 5/1997 | (WO) . |

OTHER PUBLICATIONS

Patent Cooperation Treaty Notification of Transmittal of the International Search Report or the Declaration for PCT/US98/18316, mailed Jan. 11, 1999.

Paul D. Beer et al, "Cation recognition by New Diester- and Diamide–Calix[4] arenediquinones and a Diamide–Benzo–15–Crown–5–Calix[4]arene," *Journal of Inclusion Phenomena & Molecular Recognition in Chemistry*, 19 (1994), pp. 343–359, no month.

Jan–Dirk van Loon et al, "Upper Rim Calixcrowns: Elucidation of the Mechanism of Conformational Interconversion of Calix [4]arenes by Quantitative 2–D EXSY NMR Spectroscopy," *J.Am.Chem.Soc.*, 113 (1991), pp. 2378–2384, no month.

Hyejae Ihm et al. "Molecular Engineering Part 2. Influence of side–chain Substituents in Lariat–type Upper–rim Calix [4]crowns on their Binding Properties and the reversal of These," J. Chem. So. Perkin Trans. 1, 1997, pp. 1997–2003, no month.

Kyungsoo Pack et al, "Synthesis and Binding Property of Tunable Upper–Rim Calix[4]crowns," *Chemistry Letters*, 1996 pp. 311–312, no month.

Paul D. Beer et al, "Synthesis and Co–ordination Chemistry of a Novel Bis(Benzo Crown Ether) Substituted Calix[4] arene that can Simultaneously Complex Cations and Anions," *J. Chem.Soc.Dalton Trans.*, 1995, pp. 3117–31123, no month.

Tamara J. Haverlock et al, "Applicability of a Calixarene–Crown Compound for the Removal of Cesium from Alkline Tank Waste," *Radiochimica Acta*, 76 (1997), pp. 103–108, no month.

Zouhair Asfari et al, "Doubly Crowned Calix[4]arenes in the 1,3–Alternate Conformation as Cesium Selective Carriers in Supported Liquid Membranes," *Analytical Chemistry*, 67 (1995), pp. 3133–3139, no month.

A. Casnati et al, "Synthesis, Complexation, and Membrane Transport Studies of 1,3–Alternate Calix[4]arene–crown 6 Conformers: A New Class of Cesium Selective Ionophores," *J.Am.Chem.Soc.*, 117 (1995), pp. 2767–2777, no month.

C. Hill, "Application Des Calixarenes Fonctionnalises au Traitement des Effluents Radioactifs par Membranes Liquides Supportees," Ph.D. Thesis, Universite Louis Pasteur de Strasbourg, 1994, Chapter 2, May.

(List continued on next page.)

*Primary Examiner*—Steven Bos
(74) *Attorney, Agent, or Firm*—Hardaway/Mann IP Group

(57) ABSTRACT

A solvent composition and corresponding method for extracting cesium (Cs) from aqueous neutral and alkaline solutions containing Cs and perhaps other competing metal ions is described. The method entails contacting an aqueous Cs-containing solution with a solvent consisting of a specific class of lipophilic calix[4]arene-crown ether extractants dissolved in a hydrocarbon-based diluent containing a specific class of alkyl-aromatic ether alcohols as modifiers. The cesium values are subsequently recovered from the extractant, and the solvent subsequently recycled, by contacting the Cs-containing organic solution with an aqueous stripping solution. This combined extraction and stripping method is especially useful as a process for removal of the radionuclide cesium-137 from highly alkaline waste solutions which are also very concentrated in sodium and potassium. No pre-treatment of the waste solution is necessary, and the cesium can be recovered using a safe and inexpensive stripping process using water, dilute (millimolar) acid solutions, or dilute (millimolar) salt solutions. An important application for this invention would be treatment of alkaline nuclear tank wastes. Alternatively, the invention could be applied to decontamination of acidic reprocessing wastes containing cesium-137.

15 Claims, 8 Drawing Sheets

OTHER PUBLICATIONS

C. Hill et al, "Nuclear Waste Treatment by Means of Supported Liquid Membranes Containing Calixcrown Compounds," *J.Incl.Phen.Mol.Recog.Chem.*, 19 (1994), pp. 399–408, no month.

Rocco Ungaro et al, "1,3–Dialkoxycalix[4]arenecrowns–6 in 1,3–Alternate Conformation: Cesium Selective Ligand that Exploit Cation–Arene Interactions," *Angew.Chem.Int-.Ed.Engl.*, 33 (1994), pp. 1506–1509, no month.

R. Ludwig, "Review on Calixarene–Type Macrocycles and Metal Extraction Data," Report JAERI–Review 95–022, Japan Atomic Energy Research Institute (1995), Dec.

K.C. Dean et al, "Cesium Extractive Metallurgy: Ore to Metal, "*Journal of Metals*, 1966, pp. 1198–1202, Nov.

W. Jack McDowell et al, "Selective Extraction of Cesium from Acidic Nitrate Solutions with Didodecylnaphthalene-sulfonic Acid Synergized with Bis(tert–butylbenzo)–21–crown–7," *Anal.Chem.*, 64 (1992), pp. 3013–3017, no month.

* cited by examiner

Types of Modifiers Useful in this Invention

Type One:

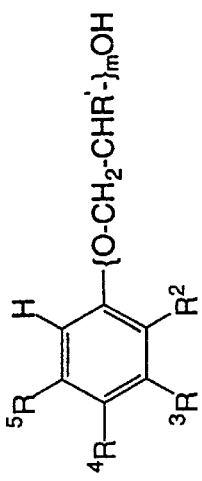

Where $R' = -H, -CH_3, -CF_3, -CH_2OH, -CH_2OCH_2CF_3,$ or $-CH_2OCF_2CF_2H$ and $m = 1$ or $2$, and $R^2, R^3, R^4,$ and $R^5$ are alkyl substituents or $-H$, where the sum total of carbon atoms is from 4 to 16, with no one group less than two carbons.

Type Two:

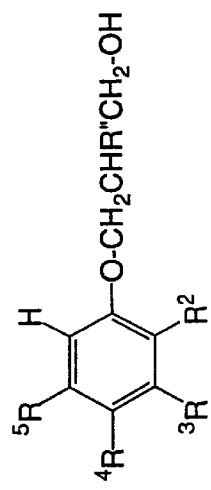

Where $R'' = -H,$ or $-CH_3$

Where $R^2, R^3, R^4,$ and $R^5$ are alkyl substituents or $-H$, where the sum total of carbon atoms is from 4 to 16, with no one group less than two carbons.

*Fig. 2*

*Representative Examples of Modifiers Tested*

| Entry | m | R' | R² | R³ | R⁴ | R⁵ |
|---|---|---|---|---|---|---|
| A | 1 | H | H | H | t-octyl | H |
| B | 1 | CH₃ | H | H | t-octyl | H |
| C | 1 | H | H | t-butyl | H | t-butyl |
| D | 1 | H | t-butyl | H | t-butyl | H |
| E | 1 | CH₂OCF₂CF₂H | H | H | t-octyl | H |

| Entry | R" | R² | R³ | R⁴ | R⁵ |
|---|---|---|---|---|---|
| F | H | H | t-butyl | H | t-butyl |
| G | H | H | H | t-octyl | H |

Structure of Modifiers A-G Shown in Figure 3
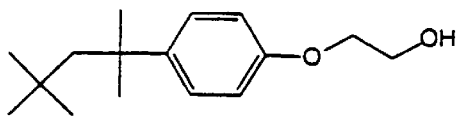
A, 2-(4-*t*-octylphenoxy)-ethanol
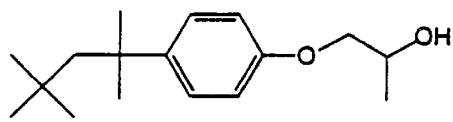
B, 1-(4-*t*-octylphenoxy)-2-propanol
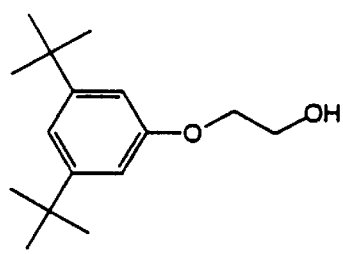
C, 2-(3,5-di-*t*-butylphenoxy)-ethanol
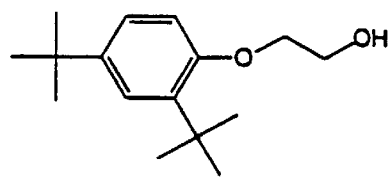
D, 2-(2,4-di-*t*-butylphenoxy)-ethanol
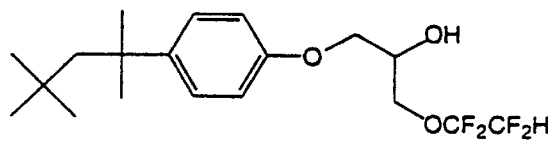
E, 1-(1,1,2,2-tetrafluoroethoxy), 3-(4-*t*-octylphenoxy)-2-propanol
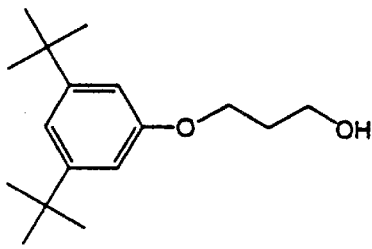
F, 3-(3,5-di-*t*-butylphenoxy)-1-propanol
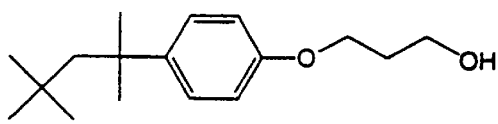
G, 3-(4-*t*-octylphenoxy)-1-propanol
*Fig. 4*

Methods for Preparing Modifiers Described in this Invention
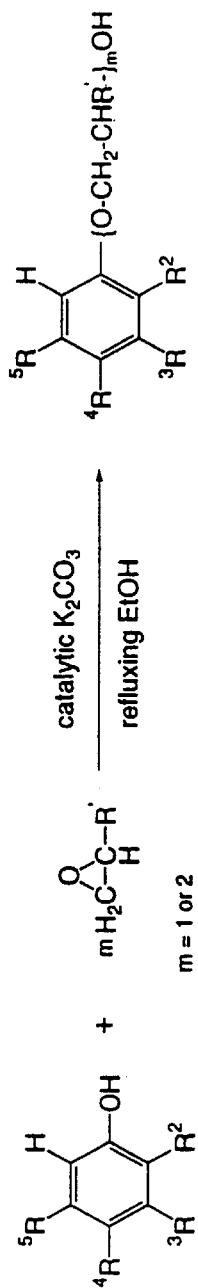
*Method One:*
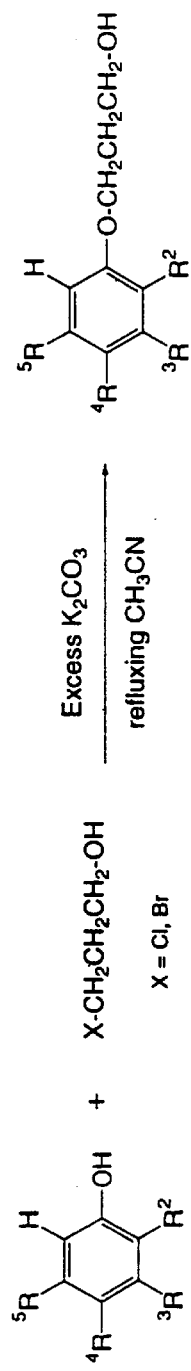
*Method Two:*
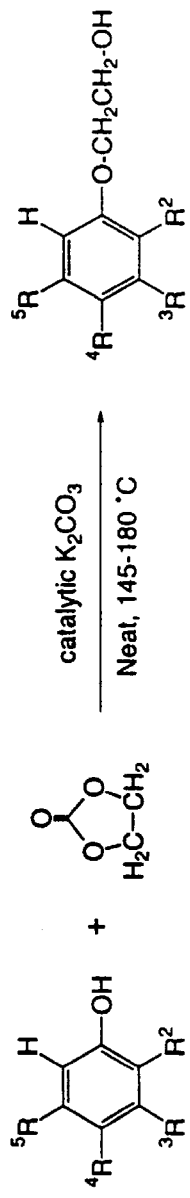
*Method Three:*
Fig. 5

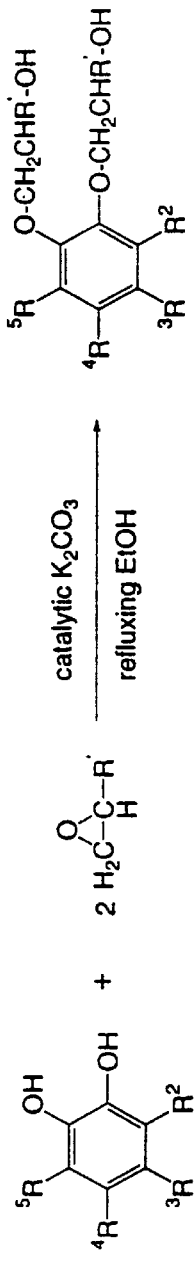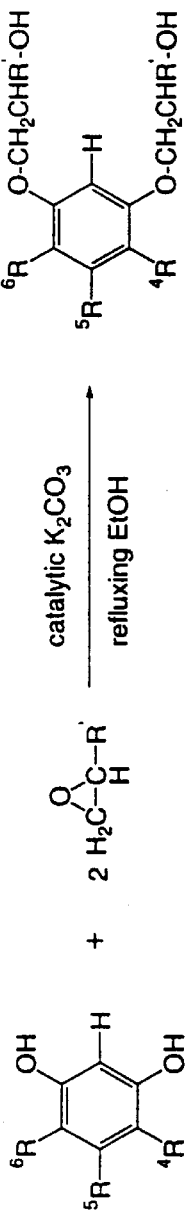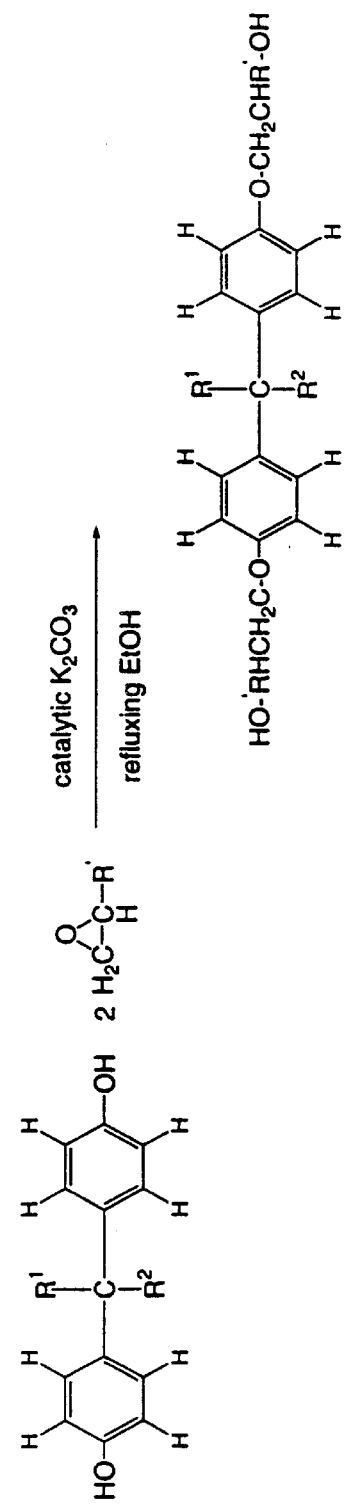
Fig. 6

Alkylaryl polyether alcohol manufactured by Union Carbide.

CALIXARENE CROWN ETHER SOLVENT COMPOSITION AND USE THEREOF FOR EXTRACTION OF CESIUM FROM ALKALINE WASTE SOLUTIONS

This Appln claims the benefit of Provisional No. 60/057,974 filed Sep. 6, 1997.

STATEMENT AS TO RIGHTS TO INVENTION MADE UNDER FEDERALLY SPONSORED RESEARCH AND DEVELOPMENT

The U.S. Government has rights in this invention pursuant to contract number DE-AC05-96OR22464 between the United States Department of Energy and Lockheed Martin Energy Research Corporation.

BACKGROUND OF THE INVENTION

1. Field of the Invention

The present invention generally relates to a composition and process for extracting metals from liquids. More particularly, this invention relates to a composition and process for extracting cesium and other metals from alkaline waste solutions, including solutions that are highly concentrated in salts. The present Application claims the benefit, under Title 35 U.S.C. §119(e), of United States Provisional Application Serial No. 60/057,974 entitled "Solvent and Process for Extracting Cesium from Alkaline Waste Solutions," hereby incorporated by reference.

Many nuclear energy complexes and treatment sites have environmental problems where cesium removal is needed. Alkaline wastes containing radioactive Cesium-137, such as those stored at the Department of Energy's Hanford. Wash., Oak Ridge, Tenn., and Savannah River, S.C. sites are examples.

No one satisfactory technology for the removal of cesium has been found due to disadvantages inherent to current methods. Solid phase sorbents (inorganic ion exchangers) do not remove and sorb cesium to a concentration sufficient to permit the cesium-loaded sorbents' ready incorporation into a waste form such as borosilicate glass in an economical or practical manner. Inorganic ion-exchange materials such as ammonium molybdophosphate, and crystalline silicotitanate can sorb cesium from dilute aqueous stripping solutions, but not from highly concentrated and alkaline raw wastes. What is more, ammonium molybdophosphate cannot be used to treat raw alkaline waste, as the material starts to dissolve at a pH above 6.

Solvent extraction processes on the other hand, contribute greater flexibility to the overall problem of treating the waste and encapsulating the cesium in a waste form. Nevertheless, there are currently no practical solvent extraction processes for the removal of cesium directly from the tanks with the waste in high salt alkaline form that the Applicants are aware of, only acid-side extraction has been addressed, and the use of acid-side solvent-extraction technology to treat the alkaline tanks would require acidification of the waste—a costly option.

Accordingly, the present invention alleviates the necessity of adding acid or other substances to the waste since cesium extraction may be effected directly from the waste matrix. As such, the present invention could play a key role in a grand treatment scheme for alkaline nuclear wastes, especially wastes with a high concentration of competing alkali metal cations.

A further problem to be solved is the need for a method which regenerates the extractant by utilizing a safe and cost-effective stripping procedure and which avoids further generation of waste. Such method should also release cesium from the extractant solvent without employing highly concentrated mineral acids, solvent evaporation or distillation, or contacting of the solvent with cation exchangers. Thus, the present invention comprises a solvent extraction and stripping process cycle for the removal of cesium from alkaline tank waste. After the solvent is stripped of cesium, the solvent can be recycled in a continuous extraction and stripping process cycle.

Previously reported extractants have generally possessed insufficient selectivity or extraction power to remove cesium from a matrix concentrated in competing alkali metal cations. In addition, earlier extraction solvents involved difficulties with stability, stripping, or phase disengagement. Thus, no other candidate solvent system has emerged as a serious contender for the targeted application.

2. Description of Related Art Including Information Disclosed Under 37 CFR 1.97 and 37 CFR 1.98

In "Cesium Extractive Metallurgy: Ore to Metal," *Journal of Metals*, 1966, pp. 1198–1202, K. C. Dean et al stress the need for methods to separate cesium from cesium ore and describe prior art used, including leaching and solvent extraction. Even so, the extractants tested there were of limited effectiveness. Among them was the compound 4-sec-butyl-2-(α-methylbenzyl)phenol (known by the acronym "BAMBP"). Although it was extensively investigated in the 1960's for potential use in extracting cesium from alkaline waste solutions, development of this material for a solvent extraction process for cesium was eventually abandoned due to a number of undesirable attributes, most notably a lack of solubility of the cesium-BAMBP complex at high cesium loadings. BAMBP also exhibited precipitation problems during the running of continuous liquid-liquid contacting, which also made it unsuitable for such processes.

Blasius et al teach the use of macrocylic polyethers for the extraction of Cesium in U.S. Pat. No. 4,647,440 ('440). This method requires an inorganic complex salt/acid to act as an extractant in tandem with the ether. The liquid phase adduct formulation described therein is not soluble in a non-polar organic diluent. For liquid-liquid extraction it was in fact only successful with a polar organic diluent, since otherwise neither the macrocyclic ether nor the inorganic complex acids/salts were soluble. The lack of phase coalescence for the liquid-liquid extraction method was problematic. It may be noted that the preferred diluent in most hydrometallurgical processes, including nuclear applications, consists of aliphatic hydrocarbons. Thus, the use of polar diluents is generally not acceptable.

In "Selective Extraction of Cesium from Acidic Nitrate Solutions with Didodecylnaphthalenesulfonic Acid Synergized with Bis(tert-butylbenzo)-21-crown-7." *Anal. Chem.*, 64 (1992), pp. 3013–3017. W. Jack McDowell et al, teach the use of other types of crown ethers for extracting cesium from acidic solutions, but with limited success. These solvent extractions involved a different class of crown ethers than those in the present invention. Disadvantages included the use of a non-aliphatic diluent, inadequate selectivity, and large consumption of acid for stripping.

R. Ludwig details several applications of calixarene-type macrocycles in the general report entitled, "Review on Calixarene-Type Macrocycles and Metal Extraction Data." Report JAERI-Review 95-022, Japan Atomic Energy Research Institute (1995). While it provides a good comprehensive survey of the literature, it shows that no calixcrowns of the type reported in the present invention have been used for the extraction of cesium. It also shows no prior applications which included investigations of alkaline nitrate solutions.

Several other papers specifically relate to the extraction of cesium using calixarene-crown ether compounds. These include Z. Asfari et al, "Doubly Crowned Calix[4]arenes in the 1,3-Alternate Conformation as Cesium Selective Carriers in Supported Liquid Membranes," *Analytical Chemistry*, 67 (1995), pp. 3133–3139; A. Casnati et al, "Synthesis, Complexation, and Membrane Transport Studies of 1,3-Alternate Calix[4]arene-crown 6 Conformers: A New Class of Cesium Selective Ionophores," *J. Am. Chem. Soc.*, 117 (1995), pp. 2767–2777; C. Hill, "Application Des Calixarenes Fonctionnalises au Traitement des Effluents Radioactifs par Membranes Liquides Supportees," Ph.D. Thesis, Universite Louis Pasteur de Strasbourg, 1994, Chapter 2; C. Hill, et al, "Nuclear Waste Treatment by Means of Supported Liquid Membranes Containing Calixcrown Compounds," *J. Incl. Phen. Mol. Recog. Chem.*, 19 (1994), pp. 399–408; and Rocco Ungaro et al, "1,3-Dialkoxycalix[4]arenecrowns-6 in 1,3-Alternate Conformation: Cesium Selective Ligand that Exploit Cation-Arene Interactions," *Angew. Chem. Int. Ed. Engl.*, 33 (1994), pp. 1506–1509. Each of the above papers and the dissertation concern the use of calix-crown compounds for cesium separation from aqueous solution, including nuclear waste. Yet all experiments described in these works dealt with acidic or neutral solutions containing no, or very low, concentrations of competing metal cations. No calix-crowns of the type disclosed in the present invention were reported. It should also be noted that the investigations of separation ability in these references aimed primarily at the use of supported liquid membranes.

Some solvent extraction data are presented in these works especially in the dissertation of Hill. Some of the calix-crowns Hill discusses in his thesis are sparingly soluble in the aromatic diluents 1,4-di-isopropylbenzene and n-hexylbenzene. However, the cesium extraction was very low (the cesium distribution ratio was on the order of $1.0 \times 10^{-2}$ from an acidic feed solution composed of 1 M $HNO_3$ and $5 \times 10^{-4}$ M $CsNO_3$), and in many cases the calix-crown was observed to precipitate from the solvent (Hill, 1994). Diluents in which these materials are soluble, such as nitrobenzene, chloroform, ortho-nitrophenylpentyl ether (NPPE), ortho-nitrophenylhexyl ether (NPHE), and ortho-nitrophenyloctyl ether (NPOE), are either too toxic (nitrobenzene, chloroform), or too expensive (NPPE, NPHE, NPOE) to be useful or practical for an actual solvent-extraction process to extract cesium from nuclear waste on a large scale. As mentioned above, aliphatic diluents are preferred for industrial use. There has also been a tendency for diluents incorporating these extractants to form undesirable precipitates or third phases when contacted with solutions containing high concentrations of alkali metal cations.

In French Patents 92 14245 and 93 04566, Dozol et al teach a method and compound relating to the extraction of cesium using calixarene-crown ether compounds. They describe the synthesis and use of specific Calix[4]arene mono-crown and bis-crown ethers dissolved in alkyl benzene or nitrophenyl alkyl ethers (hereinafter NPOE and NPHE) at 0.001 to 0.50 M for the extraction of cesium from nitric acid solutions from $10^{-3}$ to 7 M. The calix-crowns that are claimed do not, however, include the catagory of calix-crown ether described in the present invention, and no mention is made of their use in process-suitable aliphatic hydrocarbon diluents. This is presumably due to their lack of solubility and weak extractability in these diluents. Examples describing extraction of cesium from a matrix of 0.97 to 1.0 M nitric acid and $5 \times 10^{-4}$ M cesium using the calix-crowns dissolved in NPHE at 0.01 M were given, and recovering the cesium in the organic phase by contacting (stripping) the organic phase with water was mentioned. But no mention of extraction from alkaline solutions or solutions containing high concentrations of competing ions is presented. Though the claims discuss recovering cesium from "une solution aqueuse" (an aqueous solution with no mention of its pH), they are rather ill-defined in this regard and are not supported by use with alkaline or high salt solutions.

In "Applicability of a Calixarene Crown compound for the Removal of Cesium from Alkaline Tank Waste," *Radiochimica Acta*, 1997, 76, 103–108, Haverlock et al describe the use of calix[4]arene-bis-(2,3-naphtho-crown-6) at 0.01 M in orth-xylene, 1,2-dichlorobenzene, 1.2-dichloroethane, and nitrobenzene, for the separation of cesium from alkaline Hanford Tank waste simulants by solvent extraction. This calix-crown, however, is not soluble in liquid—liquid extraction process-suitable aliphatic diluents. It was in fact the lack of solubility of this and other known calix-crown materials that drove the research to develop the aliphatic-soluble calix-crown molecules described in the present invention.

Hence, new technology is required to meet the existing and future operating characteristics of methods and compositions designed to selectively extract cesium and other metals from aqueous alkaline waste solutions. There is also great need for an improved method and composition for the similar removal of cesium and other metal contaminants from neutral and acidic aqueous waste solutions.

SUMMARY OF THE INVENTION

Accordingly, an object of the present invention is to provide a composition and process for the separation of cesium from alkaline waste solutions which contain large excesses of other alkali metal ions such as sodium and potassium.

A further object of the present invention is to provide a practical alkaline-side cesium extraction process.

It is also an object of the present invention is to provide an improved composition and method for extracting cesium from acidic solutions.

Another object of the present invention is to provide a practical method for clean up of nuclear fission byproducts, such as that contained in waste tanks stored at DOE's Hanford. Wash. Savannah River, S.C. and Oak Ridge, Tenn. sites.

Yet another object of the present invention is to provide a method and composition for extracting cesium from hydrometallurgical process solutions.

Another object of the present invention is to provide a composition and method which is a substantial component of a combined process for the removal of technetium and strontium as well as cesium from alkaline waste.

These as well as other objects are accomplished by a combination of aliphatic calix-crown ethers with or without the modifiers described below in an aliphatic kerosene diluent. Taken together they comprise a liquid-liquid extraction process-suitable solvent that can be employed in a practical manner in a method for the extractive removal of cesium from alkaline solutions. The present solvent composition of calix-crown in ether-alcohol modified kerosene makes possible a practical alkaline-side cesium extraction process. Moreover, cesium contained in the solvent following the extraction method is easily recovered to regenerate the solvent by contacting the solvent with dilute aqueous electrolyte solutions including but not limited to 10 millimolar nitric acid and a combination of 0.1 to 10 millimolar nitric acid additionally containing 0.01 to 1.0 millimolar cesium nitrate.

BRIEF DESCRIPTION OF THE DRAWINGS

FIG. 2 is a diagram of two types of modifiers useful in the present invention. Here $R^{2-5}$ are alkyl substituents (including hydrogen) each having either zero or at least two carbon atoms.

FIG. 4 is a diagram of structures of modifiers A–G shown in FIGS. 3A and 3B.

FIG. 5 is a diagram of three methods for preparing the modifiers described in the present invention.

FIG. 6 is a diagram of three different specific applications of Method One shown in FIG. 5 for the preparation of bifunctional modifiers starting from but not limited to catechols, resorcinols and bis-phenols.

DETAILED DESCRIPTION

Figure 1A:
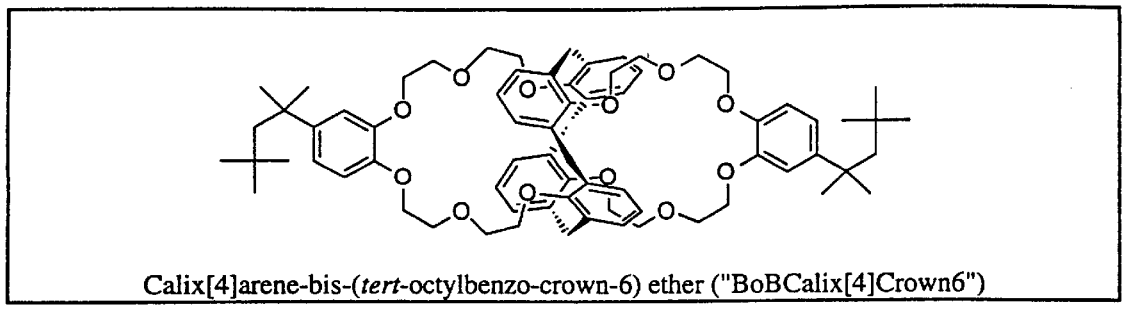
FIG. 1A is a diagram of a calix[4]arene-bis-(tert-octylbenzo-crown-6)ether molecule which is also referred to as BoBCalix[4]Crown6.

According to this invention it has been found that an efficient solvent extraction and stripping process for cesium and other metals is accomplished utilizing a specially formulated solvent. This solvent is useful for the removal of cesium from alkaline aqueous solutions such as tank waste originating from the reprocessing of irradiated nuclear fuels, especially solutions containing high concentrations of the alkali metals sodium and potassium. The solvent comprises a lipophilic calix-arene crown ether such as calix[4]arene-bis-[(4-tert-octyl-benzo)-crown-6] ("BoBCalix[4]Crown6", as shown in FIG. 1A), and one or more modifiers dissolved together in an aliphatic hydrocarbon diluent.

The process of the present invention extracts all isotopes of cesium from aqueous alkaline solutions. This is achieved through a number of conventional applications including but not limited to conventional liquid-liquid extraction, solvent impregnated resins and membrane extraction methods.

Such removal of cesium is accomplished for example by contacting the aqueous feed solution with an approximately equal volume of a solvent composed of BoBCalix[4]Crown6 at about a 0.001 to 0.20 molar concentration (0.01 molar preferred) in a water-immiscible organic diluent containing one or more modifiers at about a 0.10 to 1.0 molar total concentration (0.25 to 0.50 molar preferred). Whereby the cesium values are extracted into the organic phase. Subsequent contacting of the organic phase containing the cesium values with approximately equal volumes of a stripping solution comprised of for example pure water or dilute nitric acid (up to 100 millimolar nitric acid, with 10 millimolar preferred) affords removal of the cesium values from the organic phase into the stripping solution, whereby the organic solution containing the BoBCalix[4]Crown6 extractant and modifier is regenerated.

However, it is not a requirement that the aqueous feed solution and solvent volumes, nor the aqueous stripping solution and solvent volumes be equal. The volume ratio of the aqueous feed solution to the solvent, and the volume ratio of the aqueous stripping solution to the solvent, can range from 0.05 to 20, depending on the degree of concentration in the extracting phase desired. It is often desirable when extracting a material out of a feed solution with a solvent to employ a smaller volume of the solvent to the feed solution (feed to solvent ratio greater than 1). This concentrates the material in the solvent. It is likewise desirable when stripping the extracted material out of the solvent to employ a smaller volume of aqueous stripping solution to the solvent (strip solution to solvent ratio less than one). In this manner the concentration of the material in the stripping aqueous phase can be higher than it was in the original feed solution. This concentration makes it easier to dispose of the extracted material into a small volume in a final waste form, such as glass or cement.

Furthermore, effective stripping can additionally be accomplished by the use of aqueous solutions containing low concentrations (0.01 to 1.0 millimolar) of cesium nitrate, both with and without nitric acid present (nitric acid being in the concentration range 0.01 to 10 millimolar).

For the aqueous alkaline solutions the concentration of all isotopes of cesium taken together should range from $1.0\times 10^{-9}$ molar to 1.0 molar (M) with typical concentrations ranging from about $5\times 10^{-7}$ to $5\times 10^{-3}$ molar. For practicing the invention in neutral or alkaline solutions, it should also contain hydroxide having a concentration ranging from about $1.0\times 10^{-7}$ M to 10 M (pH should be above about 7), with about 0.010 to 5.0 M being typical. It can also contain other alkali metals such as sodium in the concentration range from about 0.01 to 10 M, potassium from about 0.001 M to 2 M, and other anions such as nitrate in the concentration range from about 0.001 M to 5.0 M.

Figure 1B:
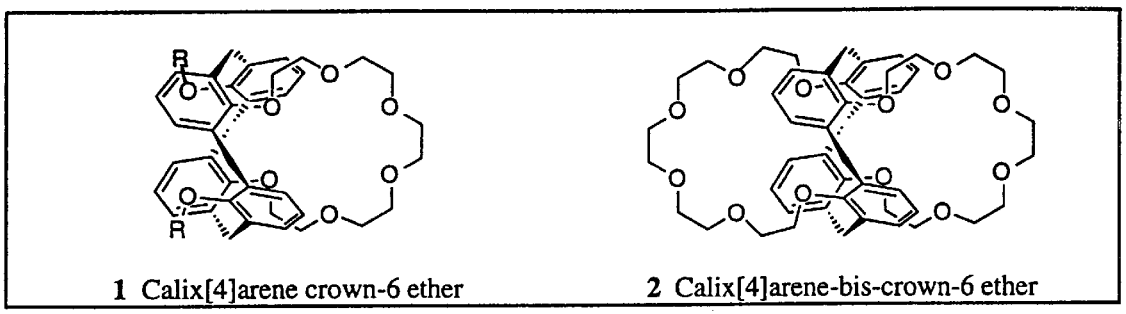
FIG. 1B is a diagram of the 1) calix[4]arene crown-6 ether molecule and 2) calix[4]arene-bis-crown-6 ether molecule.
Figure 1C:
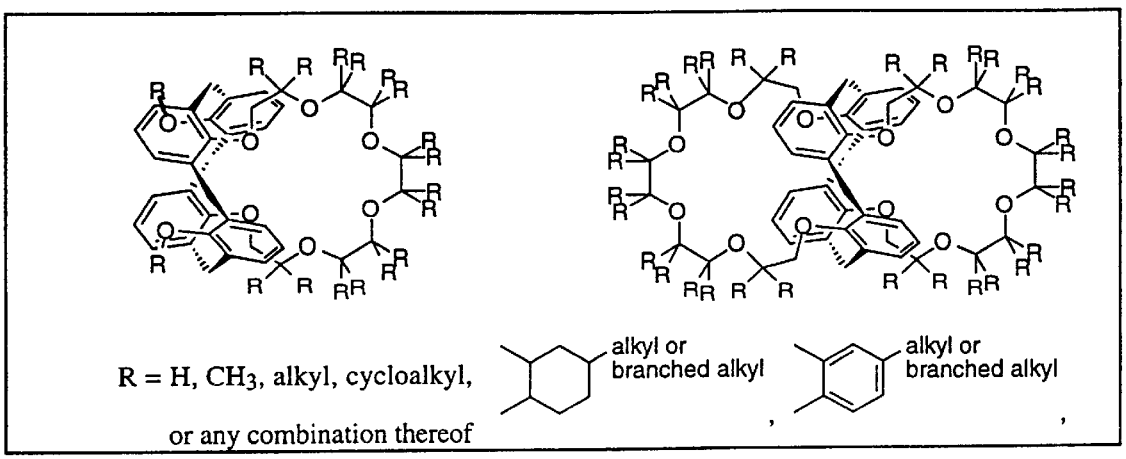
FIG. 1C is a diagram of the derivatives of the molecules depicted in FIG. 1B useful in the present invention, wherein each substituent R independently represents alkyl, cycloalkyl, doubly substituted (alkyl or branched alkyl substituted) cycloalkyl, doubly substituted (alkyl or branched alkyl substituted) alkyl-aryl functional groups, and wherein all R groups may be either identical groups, different groups, or in combination thereof.

Therefore, the preferred embodiment of the present invention is a process-suitable solvent for use in a solvent extraction and stripping process for the removal of cesium from neutral and alkaline solutions, particularly for those solutions containing large excesses of sodium and potassium to the cesium present, and especially for such solutions that constitute radioactive waste containing cesium-137. The process-suitable solvent is composed of a calix-crown compound that possesses substituents that permit its solubility in aliphatic kerosene diluents, and one or more modifiers which have been selected to act along with the calix-crown compound in the aliphatic kerosene diluent to obtain useful ($\geq$ unity) extraction ratios for cesium, while at the same time allowing for acceptable regeneration of the solvent via stripping, and good phase coalescence behavior. (These modifiers are chemically stable, non-toxic, and have flash points above 60° C). Thus the preferred method includes use of BoBCalix[4]Crown6 shown in FIG. 1A, or any of the similar substituted derivatives shown in FIG. 1C, as well as any combinations thereof; with the modifier shown in FIG. 4 as E, 1-(1,1,2,2-tetraflouroethoxy) 3-(4-t-octylphenoxy)-2-propanol or any of the similar substituted derivatives A–D and F–G, in ISOPAR™ or a similar solvent extraction process-suitable kerosene diluent.

EXAMPLES

For all examples below, Cesium was extracted from simulants of Hanford tank AW-101 Double-Shell Slurry Feed (DSSF-7) and Hanford tank 241-AP-106 Dilute Neutralized waste (AP-106), the contents of which are shown below in Table 1.

TABLE 1

Composition of Hanford waste simulants used in this study.

| | Concentration (M) | |
|---|---|---|
| Species | AP-106 simulant[a] | DSSF-7 simulant[b] |
| $Na^+$ | $2.41 \times 10^{-1}$ | 7.00 |
| $K^+$ | $2.09 \times 10^{-2}$ | $9.45 \times 10^{-1}$ |
| $Cs^+$ | $1.15 \times 10^{-6}$ | $7.0 \times 10^{-5}$ |
| $Al^{3+}$ | $7.84 \times 10^{-3}$ | $7.21 \times 10^{-1}$ |
| $OH^-$ (total) | $1.16 \times 10^{-1}$ | 4.63 |
| $OH^-$ (free) | $8.41 \times 10^{-2}$ | 1.75 |
| Theoretical pH | 12.9 | 14.6 |
| $F^-$ | $9.14 \times 10^{-3}$ | not added |
| $Cl^-$ | $2.35 \times 10^{-3}$ | $1.02 \times 10^{-1}$ |
| $NO_2^-$ | $2.54 \times 10^{-2}$ | 1.51 |
| $NO_3^-$ | $8.58 \times 10^{-2}$ | 3.52 |
| $SO_4^{2-}$ | $1.48 \times 10^{-3}$ | $8.0 \times 10^{-3}$ |
| $CO_3^{2-}$ | $8.09 \times 10^{-3}$ | $1.47 \times 10^{-1}$ |
| $PO_4$ | $2.22 \times 10^{-3}$ | $1.4 \times 10^{-2}$ |
| $^{99}TcO_4^-$ | $8.0 \times 10^{-7}$ | not added |

[a] AP-106 approximates Hanford tank 241-AP-106 Dilute Neutralized waste.
[b] DSSF-7 approximates Hanford tank AW-101 Double-Shell Slurry Feed.

Examples 1a, 1b, and 1c

Figure 7:
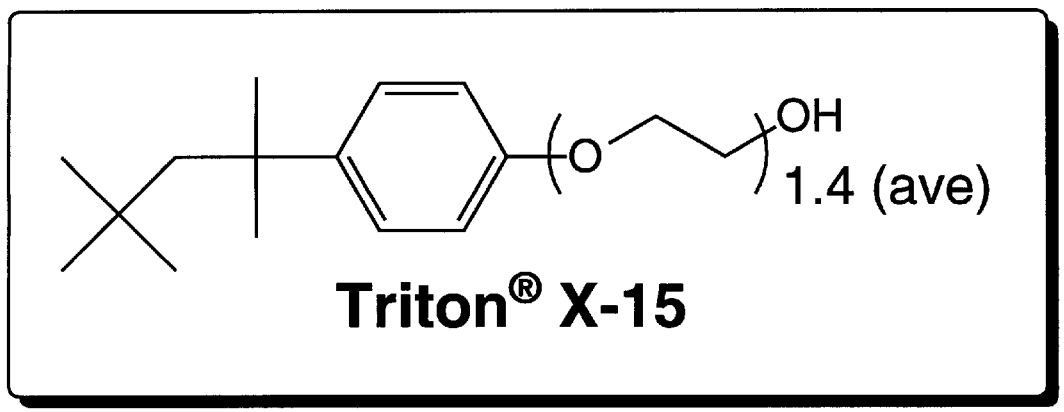
FIG. 7 is a diagram of the alkylaryl polyether alcohol mixture, TRITON™ X-15.

Alkylaryl polyether alcohols as modifiers. TRITON™ X-15, tributyl phosphate (TBP), NPOE, and EXXAL™ 12 (a branched C-12 alcohol available from Exxon Chemical Company) were first tested as modifiers for extraction using calix-arene crown-ethers. The results were then compared with the prior art in Table 2.

cesium. Nonetheless, molecules having their general structure are useful as modifiers for the present invention. For example, TRITON™ X-15, a 4-tert-octylphenyl-substituted polyether alcohol (shown in FIG. 7) was found to be an effective modifier when used in combination with the calix-crown for enhancing the extractability of Cs, as examples 1A and 1B in Table 2 illustrate. However, it was discovered that the phase coalescence behavior upon stripping solvents containing TRITON™ X-15 as a modifier was less than ideal. Although TRITON™ X-15 is not the preferred structure, it is similar in structure to compounds better suited as modifiers in the present invention, specifically modifiers A, B, E and G shown in FIG. 4. But unlike these later developed modifiers, TRITON™ X-15 is a mixture of materials containing one and two ethylene oxide units, with the average number of ethylene oxide units for the mixture being around 1.4 to 1.5 for the commercial product. It belongs to a class of nonionic surfactants available commercially from Union Carbide, having the general structure 4-alkyl-phenyl-$(OCH_2CH_2)_nOH$, where the alkyl group is tert-octyl for the TRITON™ X series, and nonyl for the TRITON™ N series. The number of ethylene oxides units can range from n=1 to n=70 (or more).

However, solubility in aliphatic hydrocarbon solvents decreases as the number of ethylene oxide units increases; when n is greater than 4, the surfactant is too hydrophilic to be soluble in aliphatic hydrocarbons. Accordingly, TRITON™ surfactants suitable as modifiers in solvent extraction of the present invention are limited to the TRITON™ X or N class where the number of ethylene oxide units is less than four such as TRITON™ X-15, TRITON™ X-35, and TRITON™ 17.

Comparative Examples 2–6

At the very least TRITON™ X-15 exhibits properties which make it clearly superior to several other common

TABLE 2

Comparison of 1) cesium extraction from a Double Shell Slurry Feed waste simulant (DSSF-7 simulant), and 2) stripping efficiency using 10 mM nitric acid, between prior art solvents and solvents comprising the present invention. Distribution ratios of cesium (D(Cs)) indicate the relative amount of cesium between solvent and aqueous phases after contact and equilibration. Percent Cs stripped from the resulting solvent phase is after two contacts. BoBCalix[4]Crown6 is calix[4]arene-bis-[(4-t-octyl-benzo)-crown-6], NPOE is ortho-nitrophenyl octyl ether, and TBP is Tributyl Phosphate.

| Example Number | Calixarene-crown [M] | Modifier [M] | Diluent | D(Cs) | % Cs stripped |
|---|---|---|---|---|---|
| 1a | BoBCalix[4]Crown6 0.01M | Triton ® X-15 0.25M | Isopar ® L | 1.00 | 99 |
| 1b | BoBCalix[4]Crown6 0.01M | Triton ® X-15 0.50M | Isopar ® L | 1.10 | Not Determ. |
| 1c | none (control) | Triton ® X-15 0.25M | Isopar ® L | $3.0 \times 10^{-4}$ | Not Determ. |
| | Comparative | Examples | | | |
| 2 | BoBCalix[4]Crown6 0.02M | TBP 0.25M | Isopar ® L | $1.4 \times 10^{-2}$ | Not determined |
| 3 | BoBCalix[4]Crown6 0.01M | NPOE 0.50M | Isopar L | $5.7 \times 10^{-2}$ | >99 |
| 4 | BoBCalix[4]Crown6 0.01M | Exxal ® 12 (dodecyl alcohol) 0.50M | Isopar ® L | 0.22 | >99 |
| 5 | calix[4]arene bis-crown-6 (prior art) 0.01M | none | NPOE | 0.69 | 79 |
| 6 | BoBCalix[4]Crown6 0.01M | none | NPOE | 0.87 | 83 |

To the Applicants' knowledge, TRITON™ surfactants have never been employed for the purpose described herein, that is, as solvent modifiers in the solvent extraction of modifiers for use in the present invention. Compared to typical modifiers such as tributyl phosphate (TBP), NPOE, and dodecyl alcohol, it exhibited marked advantages. For example, the cesium distribution ratio (D(Cs)) from the DSSF-7 simulant for TRITON™ X-15 when used at 0.25 M and 0.50 M in ISOPAR™ L with BoBCalix[4]Crown6 at 0.01 M, is respectively 1.00 and 1.10. (examples 1a and 1b). Values using TBP (0.25M), however, even at twice the BoBCalix[4]Crown6 concentration (0.02 M), were only 0.014 (example 2). Likewise, when ortho-nitrophenyl octyl ether (NPOE) is employed at 0.50 M in ISOPAR™ L diluent (example 3), the cesium distribution ratio is only 0.057. Simple aliphatic alcohols such as dodecyl alcohol (EXXAL™ 12, manufactured by Exxon; example 4) used at 0.50 M are somewhat more effective, but the cesium distribution ratio at 0.22 is still only about one-fifth of that obtained using TRITON™ X-15 at the same concentration (compare example 1b with example 4).

In the prior art, NPOE and ortho-nitrophenyl hexyl ether (NPHE) were employed as diluents for calix crowns such as calix[4]arene bis-crown-6 (Dozol et al., 1992: Dozol et al., 1993; see structure 2 in FIG. 1B) due to the lack of solubility of this calix crown and the related calix[4]rene-bis( 1,2-benzo-crown-6) and calix[4]arene-bis(2,3 -naphtho-crown-6) in aliphatic diluents. NPOE and NPHE are unsuitable as process diluents due to their great expense and high viscosity. Nevertheless, for comparison, both calix[4]arene bis-crown-6 and BoBCalix[4]Crown6 were tested for extraction of cesium from DSSF-7 simulant at 0.01 M in NPOE (examples 5 and 6 in Table 1). In both cases, both the cesium distribution ratio (0.69 and 0.87, respectively), and the stripping efficiency were lower than that obtained using TRITON™ X-15 as a modifier at 0.25 M in ISOPAR™ L (example 1a).

Figure 8:
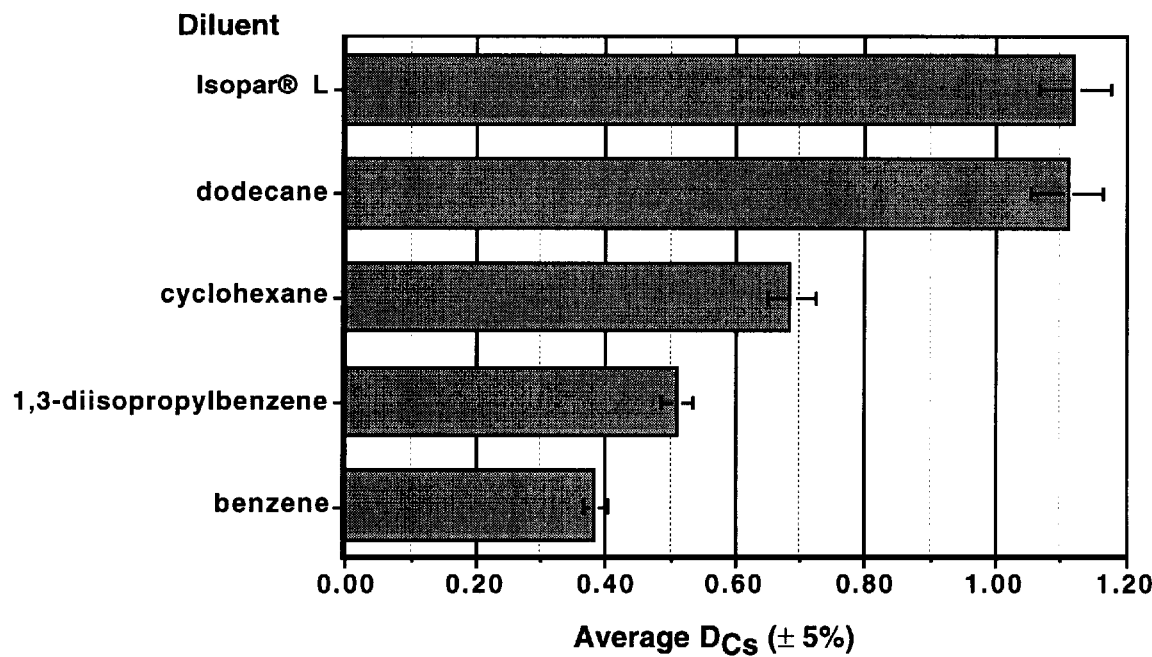
FIG. 8 is a bar graph designating the extractability of cesium from a Hanford site waste simulant described in Table 2 below by 0.01 Molar BoBCalix[4]Crown6-ether in various diluents containing 0.05 Molar TRITON™ X-15.

The beneficial effect that alkyl-aryl polyether alcohol modifiers such as TRITON™ X-15 have on the extraction of cesium is most pronounced for normal and branched aliphatic diluents (e.g., n-dodecane and ISOPAR™ L), and less so for cyclic aliphatics and aromatics, as is illustrated in FIG. 8. The cesium distribution ratio is three times higher for TRITON™ X-15 at 0.50 M in n-dodecane and ISOPAR™ L than it is in benzene.

It should also be noted that the cesium distribution ratio afforded by the TRITON™ X-15 modifier itself without the presence of the calix-crown is very low, as is illustrated in example 1c showing the need for calix-crown ethers as the extractant).

Examples 7–12

Alkylaryl ether alcohols. In view of the limited effectiveness of an alkylaryl polyether alcohols, such as TRITON™ X-15 for an extraction and stripping process, various alkylaryl ether alcohols with optimal phase coalescence properties were developed. Structures of these compounds, designated by letters A–G, are shown in FIG. 4. A comparison of the polyether TRITON™ X-15 with the newly developed compounds illustrates the importance of these changes in modifier structure and is presented in Table 3 below.

TABLE 3

Comparison of 1) cesium extraction from a DSSF-7 waste simulant, and 2) stripping efficiency using 10 mM nitric acid both as functions of modifier structure. All modifiers are at 0.25M in ISOPAR L diluent, and the extractant is BoBCalix[4]Crown6 at 0.01M, unless otherwise noted. Percent Cs stripped is after two contacts. "ND" = not determined.

| Example | Modifier | [Calix-Crown] | D(Cs) | % Cs stripped | Phase Coalescence on stripping |
|---|---|---|---|---|---|
| 1a | Triton ® X-15 at 0.25M | 0.01 | 1.00 | 99 | terrible; emulsion formation |
| 1b | Triton ® X-15 at 0.50M | 0.01 | 1.10 | ND | |
| 1c | Triton ® X-15 at 0.25M | none | $3.0 \times 10^{-4}$ | ND | |
| 7a | A, 2-(4-t-octylphenoxy)-ethanol | 0.01 | 1.06 | 92 | very poor; emulsion formation |
| 7b | | none | ND | ND | |
| 8a | B, 1-(4-t-octylphenoxy)-2-propanol | 0.01 | 0.53 | 96 | very good |
| 8b | | none | $5.4 \times 10^{-4}$ | 97 | |
| 9a | C, 2-(3,5-di-t-butyl-phenoxy)-ethanol | 0.01 | 0.74 | 99 | very good |
| 9b | | none | ND | ND | |
| 10a | E, 1-(1,1,2,2-tetrafluoro-ethoxy)-3-(4-t-octyl-phenoxy)-2-propanol | 0.01 | 0.99 | 93 | excellent in all cases |
| 10b | | 0.02 | 2.02 | 92 | |
| 10c | | none | $3.0 \times 10^{-3}$ | ND | |
| 11a | F, 3-(3,5-di-t-butyl-phenoxy)-1-propanol | 0.01 | 0.75 | >99 | very good in all cases |
| 11b | F at 0.50M | 0.01 | 0.89 | 95 | |
| 11c | F at 0.50M | 0.02 | 1.82 | 97 | |
| 11d | F at 0.25M | none | $2.6 \times 10^{-4}$ | 98 | |
| 12a | G, 3-(4-t-octyl-phenoxy)-1-propanol | 0.01 | 1.18 | 90 | very good |
| 12b | | none | ND | ND | |

As seen in examples 1a–1c, due to its surface active properties, the phase coalescence behavior using TRITON™ X-15 was poor. This was true especially during the stripping contacts in which the organic solvent loaded with cesium was stripped with water or dilute (5–10 mM) nitric acid, and a tendency to form emulsions was noted. Although phase coalescence improved when 10 mM nitric acid was used in place of water, it was still poor, and as such TRITON™ X-15 was judged unsuitable for a process where vigorous contacting of the two phases would be expected. Thus, modifications were made to the base TRITON™ X-15 structure in order to improve the phase coalescence behavior. Entries B–G in FIGS. 3 and 4 illustrate these modifications to the base 2-(4-t-octylphenoxy)ethanol structure. Moreover, the performance of the resulting modifiers A–C and E–G is shown in Table 3 in examples 7–12.

Example 13

Like modifiers A–C and E–G shown above, modifier D was developed as an improvement over TRITON™ X-15, but it was used as a blend with TRITON™ X-15. The results are detailed by Example 13 in Table 4 below.

TABLE 4

Cesium extraction from DSSF-7 waste simulant by a solvent containing TRITON ® X-15 blended with modifier D in ISOPAR ® L diluent. The extractant is BoBCalix[4]Crown6 at 0.01M, and percent Cs stripped is after two contacts using 10 mM nitric acid.

| Example | Modifier (Blended at 0.125M with Triton ® X-15 at 0.125M) | [Calix-Crown] | D(Cs) | % Cs stripped | Phase Coalescence on stripping |
|---|---|---|---|---|---|
| 13a | D, 2-(2,4-di-t-butyl-phenoxy)-ethanol | 0.01 | 0.99 | 98 | very good |
| 13b | | none | $1.0 \times 10^{-3}$ | 98 | |

In essence, the structural modifications made to TRITON™ X-15 are designed to a) decrease the surface active properties by disrupting the ability to form oriented layers at the organic-aqueous interface, and b) possibly enhance the extractability of cesium from selected waste streams. The placement of an alkyl substituent on the alcohol portion of the modifier as in the case of modifier B (example 8a), results in a vast improvement in the phase coalescence behavior, but unfortunately a nearly 50% decrease in the extractability of cesium was obtained. To combat this, the nature and position of the alkyl groups attached to the aromatic ring were changed (as in modifiers C and D), leaving the ethanol portion intact. This improves the phase coalescence properties with only minimal decreases in the extractability of cesium. Accordingly, use of modifier C in place of TRITON™ X-15 results in only a 25% decrease in efficiency but gives good phase coalescence properties (example 9a), similar use of modifier D as a blend with TRITON™ X-15 (each at 0.125 M), resulted in a vast improvement in the phase coalescence properties, relative to TRITON™ X-15 alone at 0.25 M (compare example 13a with example 1a), with essentially no decrease in the cesium distribution coefficient. Additionally, extending the alkyl chain in the alcohol portion of the modifier from two carbons to three carbons represented by the progressions from modifier A to G, (example 12a) and C to F, (example 11a) resulted in an improvement in both the cesium extraction ratio, and the phase coalescence. Surprisingly, simply extending the carbon chain from two to three carbons in the case of modifier G was apparently sufficient to essentially eradicate the emulsion formation observed on stripping for modifier A (2-(4-t-octylphenoxy)-ethanol.

Examples 14 and 15

Modifier F was further tested for extraction of cesium from other types of waste simulants and was found to perform better than TRITON™ X-15 with regard to cesium extraction from a solution simulating the supernatant liquid contained in Hanford tank 241-AP-106, providing a cesium distribution ratio of 3.05, versus 1.02 for TRITON™ X-15 under the same extraction conditions (examples in Table 5 below).

TABLE 5

Comparison of cesium extraction from DSSF-7 and AP-106 waste simulant for TRITON ™ X-15 and Modifier F (3,(3,5-di-t-butylphenoxy)-1-propanol). All modifiers are at 0.50M in ISOPAR ™ L diluent, and the extractant is BoBCalix[4]Crown6 at 0.01M

| Example | Modifier | Simulant | D(Cs) |
|---|---|---|---|
| 11b | F, 3-(3,5-di-t-butyl-phenoxy)-1-propanol | DSSF-7 | 0.89 |
| 1b | Triton ® X-15 | DSSF-7 | 1.10 |
| 14 | F, 3-(3,5-di-t-butyl-phenoxy)-1-propanol | AP-106 | 3.05 |
| 15 | Triton ® X-15 | AP-106 | 1.02 |

Finally, the incorporation of fluorine into the modifier structure also appears to confer beneficial properties both for extraction and stripping. Modifier E possesses a pendant —CH$_2$OCF$_2$CF$_2$H on the carbon alpha to the hydroxyl group which increases the cesium extraction ratio to the same level as that of TRITON™ X-15 (example 10a), without the adverse emulsion-forming tendency observed during stripping. In fact, the phase-coalescence behavior with this modifier was excellent. At a higher BoBCalix[4]Crown6 concentration of 0.02 M, modifier E at a concentration of 0.25 M, exhibits a cesium extraction ratio which surpasses 2, and a stripping efficiency which is still over 90%. It is believed that the incorporation of fluorine into key positions in the modifier can enhance extraction efficiency by altering the donor-acceptor properties of the ether oxygens (making the oxygen a poorer donor and better acceptor, which appears to be beneficial to cesium extraction).

Details of Examples

To extract cesium, the solvent is directly contacted with an immiscible aqueous solution containing the cesium at any concentration under appropriate conditions, using liquid-liquid contacting techniques and equipment familiar to those skilled in the art.

General Extraction and Stripping Procedure for Examples 1–13

A synthetic waste solution simulating Hanford Double Shell Slurry Feed waste consisting of cesium at 7.0×10$^{-5}$ M, sodium (7.0 M), potassium (0.95 M), aluminum (0.72 M), nitrate (3.52 M), nitrite (1.51 M), carbonate (0.15 M), chloride (0.10 M), phosphate (0.014 M), and sulfate (0.008 M), and having a pH>14 (1.75 M in hydroxide), hereafter referred as "DSSF-7", was prepared. The sodium to cesium and potassium to cesium concentration ratios for this simulant are respectively 1.0×10$^5$ and 1.36×10$^4$ to one. Aliquots of this simulant were contacted with an equal volume of calix[4]arene-bis-[(4-t-octyl-benzo)-crown-6] ("BoBCalix[4]Crown6") at the desired concentration in the desired diluent or modified diluent, for 1 hour at 25° C. in sealed borosilicate vials by end-over-end rotation at ~30 RPM. This constituted "pre-equilibrating" the solvent. Aliquots of the organic phase were then removed, and contacted, as above, with DSSF-7 simulant now containing added cesium-137 tracer at an activity level of 0.42–0.46 microcuries per milliliter simulant. Kinetics measurements have shown that equilibrium is reached within 5 minutes using this method of contacting (less than 10 seconds if vigorous agitation is used), albeit an equilibrium time of 1 hour was selected to allow the solutions to come to temperature and for convenience. After allowing the phases to coalesce, aliquots of the aqueous and organic phases were removed, and the samples were allowed to sit for at least one hour to allow the extracted $^{137}$Cs to achieve secular equilibrium with its daughter decay product $^{137m}$Ba. The $^{137m}$Ba activity in each phase was then determined by measuring the activity of the 662 KeV peak using standard gamma counting techniques. An aliquot of the organic phase was then contacted twice successively with an equal volume of 10 millimolar nitric acid, to strip the cesium out of the organic, using the contacting and sub-sampling procedures described above. The aqueous and organic phases were sub-sampled after each contact, and the samples were allowed to come to secular equilibrium prior to gamma counting.

General Extraction Procedure for Examples 14 and 15

The same extraction contacting procedure as described above was employed, except that a synthetic waste solution simulating the supernatant liquid from Hanford tank 241-AP-106 was used in place of the DSSF-7 simulant. The AP-106 waste simulant consisted of cesium at a total concentration of $1.15 \times 10^{-6}$ M, which includes $^{137}$Cs tracer at $3.8 \times 10^{-8}$ M (0.45 microCuries per milliliter simulant), sodium (0.24 M), potassium (0.021 M), aluminum ($7.8 \times 10^{-3}$ M), nitrate (0.086 M), nitrite (0.025 M), carbonate ($8.1 \times 10^{-3}$ M), chloride (0.024 M), phosphate ($2.2 \times 10^{-3}$ M), sulfate ($71.5 \times 10^{-3}$ M), chromate ($9.1 \times 10^{-5}$), and fluoride ($9.1 \times 10^{-3}$), and having a pH of 12.9 (0.084 M in free hydroxide). The sodium to cesium and potassium to cesium concentration ratios for this simulant are respectively $2.09 \times 10^{5}$ and $1.8 \times 10^{4}$ to one.

Specific Extraction and Stripping Procedures for Various Examples

Example 1a

A synthetic waste solution simulating Hanford Double Shell Slurry Feed waste consisting of cesium at $7.0 \times 10^{-5}$ M (with cesium-137 tracer added at 0.4 microCuries per liter) as described above was contacted with an equal volume of calix[4]arene-bis-[(4-t-octyl-benzo)-crown-6] ("BoBCalix[4]Crown6") at 0.010 M and TRITON™ X-15 at 0.25 M in ISOPAR™ L iso-paraffinic diluent, for 1 hour at 25° C. in sealed borosilicate vials by end-over-end rotation at ~30 RPM. After allowing the phases to coalesce, aliquots of the aqueous and organic phases were removed and the $^{137m}$Ba activity in each phase determined, as described above. The ratio of activity in the organic phase to the aqueous phase for the duplicates was 1.004±0.005 (mass balance was 98%), indicating that 50.1% of the cesium contained in the DSSF-7 simulant had been removed on one extraction contact. An aliquot of the organic phase was then contacted twice successively with an equal volume of 10 millimolar nitric acid, to strip the cesium out of the organic, using the contacting and sub-sampling procedures described above. The aqueous and organic phases did not separate cleanly, particularly following the second stripping contact, and required centrifugation (more severe agitation, i.e. vortexing instead of end-over-end rotation, leads to the formation of a thick white emulsion at the interface during stripping with this modifier). After two contacts, 99.0% of the cesium present in the loaded organic phase was removed (see Tables 1 and 3, supra).

Example 10a

The experiment as described in example 1a above was conducted using calix[4]arene-bis-[(4-t-octyl-benzo)-crown-6] ("BoBCalix[4]Crown6") at 0.010 M, 1-(1,1,2,2-tetrafluoroethoxy)-3-(4-t-octylphenoxy)-2-propanol (modifier E from FIGS. 3 and 4, prepared by reacting 4-t-octyl phenol with glycidyl 1,1,2,2-tetrafluoroethyl ether) at 0.25 M, in ISOPAR™ L iso-paraffinic diluent, for 1 hour at 25° C. in sealed borosilicate vials by end-over-end rotation at ~30 RPM. The ratio of activity in the organic phase to the aqueous phase following the extraction contact was 0.987±0.001 (mass balance was 99.6%), indicating that 49.7% of the cesium contained in the DSSF-7 simulant had been removed on one extraction contact. An aliquot of the organic phase was then contacted twice successively with an equal volume of 10 millimolar nitric acid, to strip the cesium out of the organic, using the contacting and sub-sampling procedures described above. The phases separated immediately and very cleanly following the contacting procedure. After two contacts, 92.8% of the cesium present in the loaded organic phase was removed (see Table 3, supra).

Example 11c

The experiment as described in example 1a above was conducted using calix[4]arene-bis-[(4-t-octyl-benzo)-crown-6] ("BoBCalix[4]Crown6") at 0.020 M and 3-(3,5-di-t-butylphenoxy)-1-propanol (modifier F from FIGS. 3 and 4, prepared by reacting 3,5-di-t-butyl phenol with 3-chloro-1-propanol) at 0.50 M in ISOPAR™ L iso-paraffinic diluent, for 1 hour at 25° C. in sealed borosilicate vials by end-over-end rotation at ~30 RPM. The ratio of activity in the organic phase to the aqueous phase following the extraction contact was 1.822±0.004 (mass balance was 100%), indicating that 64.5% of the cesium contained in the DSSF-7 simulant had been removed on one extraction contact. An aliquot of the organic phase was then contacted twice successively with an equal volume of 10 millimolar nitric acid, to strip the cesium out of the organic, using the contacting and sub-sampling procedures described above. The phases separated immediately and cleanly following the contacting procedure—no emulsions were observed to form. After two contacts, 96.9% of the cesium present in the loaded organic phase was removed (see Table 3, supra).

Example 13a

The experiment as described in example 1a above was conducted using calix[4]arene-bis-[(4-t-octyl-benzo)-crown-6]("BoBCalix[4]Crown6") at 0.010 M, 2-(2,4-butylphenoxy)-ethanol (modifier D from FIGS. 3 and 4, prepared by reacting 2,4-di-t-butyl phenol with ethylene carbonate at 160–180° C.) at 0.125 M, and TRITON™ X-15 at 0.125 M, in ISOPAR™ L iso-paraffinic diluent, for 1 hour at 25° C. in sealed borosilicate vials by end-over-end rotation at ~30 RPM. The ratio of activity in the organic phase to the aqueous phase following the extraction contact was 0.994±0.012 (mass balance was 99%). indicating that 49.8% of the cesium contained in the DSSF-7 simulant had been removed on one extraction contact. An aliquot of the organic phase was then contacted twice successively with an equal volume of 10 millimolar nitric acid, to strip the cesium out of the organic, using the contacting and sub-sampling procedures described above. The phases separated immediately and cleanly following the contacting procedure—no emulsions were observed to form. After two contacts, 98.4% of the cesium present in the loaded organic phase was removed (see Table 4, supra).

Extractants

Calixarene-crown ethers useful for this process include calix[4]arene-crown-6 and calix[4]arene-bis(crown-6) ethers additionally containing appropriate alkyl substituents to provide the requisite solubility in aliphatic kerosene diluents for use in a solvent extraction process. The calix-crown BoBCalix[4]Crown6, as the free ligand, has a measured solubility of 10 millimolar in ISOPAR™ L at 25° C. This is the minimum degree of solubility necessary for useful cesium distribution ratios to be achieved in a process, even in the presence of modifiers. The solubilities of the prior art calix-crowns as free ligands, calix[4]arene-bis-crown-6 and calix[4]arene-bis(2,3-benzo-crown-6) are much less, at 2.7 and 0.24 millimolar, respectively. Furthermore, the prior art calixcrowns tend to precipitate from solution when a metal such as cesium is complexed. The calixcrown BoBCalix[4]Crown6 is much more soluble even when a metal is complexed and the modifiers greatly enhance the solubility. Calix[4]arene crown ethers consist of two structural units which together provide the requisite properties necessary for the efficient and selective extraction of cesium cation: a) a calix[4]arene in the 1,3 alternate conformation and b) one or two crown ether units, with each crown ether unit specifically containing six ether oxygen atoms, such as those shown in structures 1 and 2 in FIG. 1B.

Figure 1D:
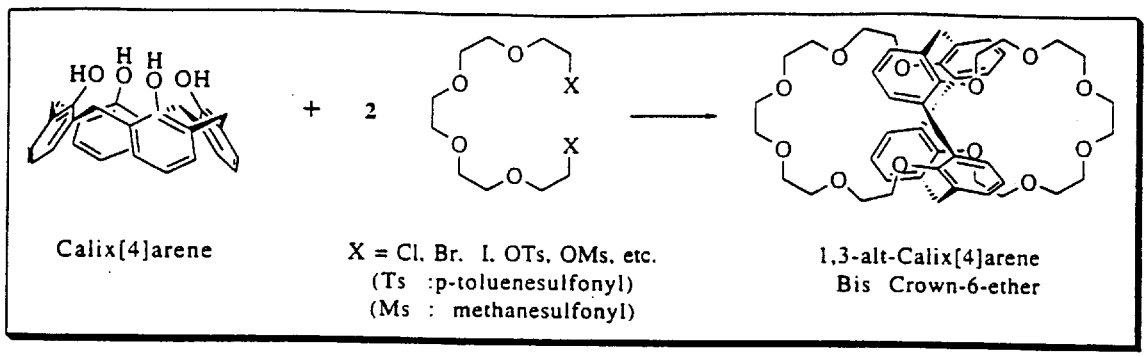
FIG. 1D is a diagram of the synthesis of a 1,3-alt-calix[4]arene bis crown-6-ether.

This invention specifically includes the development of calix[4]arene crown-6 ethers which meet the process requirements of a practical solvent extraction system. Extractants useful for this purpose fall into the class of calix[4]arene crown-6 ethers in the 1,3 alternate conformation bearing branched hydrocarbon substituents on the crown ether portion of the extractant molecule. The branched hydrocarbon substituents include aliphatic, cycloaliphatic, and alkyl-aryl substituents, of the types shown in FIG. 1C. Furthermore, a general procedure for attaching the crown ether portion to the calix[4]arene portion to prepare the bis-crown is shown in FIG. 1D. These examples are representative and should not be construed as being inclusive. A representative example of such a process compatible calix[4]arene crown ether shown in FIG. 1A was prepared and its applicability for incorporation into a cesium extraction solvent demonstrated.

This example known as calix[4]arene-bis-[(4-tert-octyl-benzo)-crown6]ether (hereinafter also referred to as BoBCalix[4]crown 6) is the preferred extractant for the present invention. It was chosen based on its synthetic accessibility and the knowledge of the inventors that aromatic substituents bearing large, highly branched alkyl substituents provide high solubility and lipophilicity to crown ethers. This compound was originally prepared in four synthetic steps, as outlined in FIG. 1D, from commercially available reagents. The product is a white microcrystalline solid which can be readily purified to high analytical purity by recrystallization. The synthesis has been performed on multigram (10–100 g) scale and is amenable to scale-up.

Extractant Syntheses

Figure 1E:
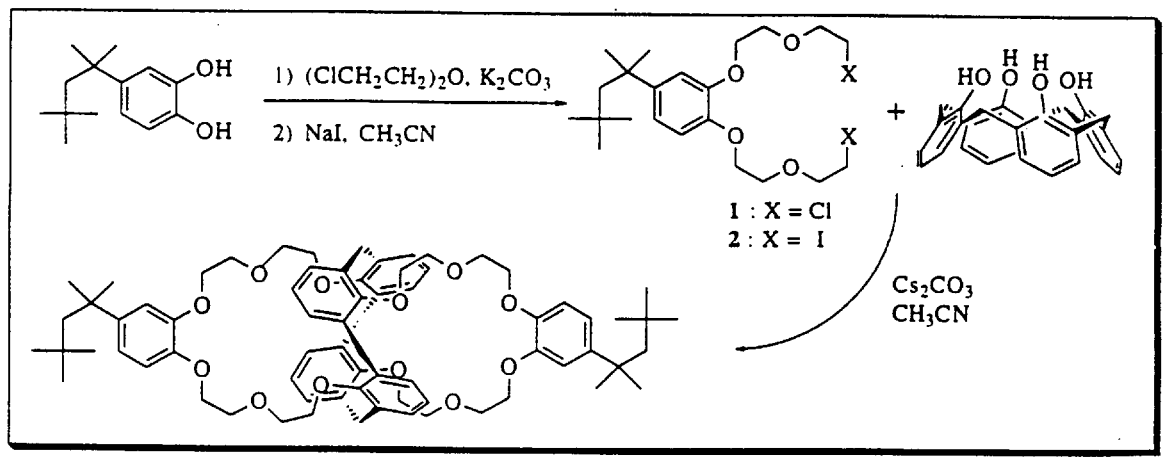
FIG. 1E is a diagram of the synthesis of calix[4]arene-bis-[(4-tert-octyl-benzo)-crown6]ether.

Synthesis of Calix[4]arene-bis-crown-6 ethers. The general procedure for the synthesis of bis-crown calix[4]arenes consists of reacting the calix[4]arene with two equivalents of αω-polyethylene glycol dihalide (or other appropriate reagent) under basic conditions in an appropriate solvent, as outlined in FIG. 1D. Typical conditions use $K_2CO_3$ or $Cs_2CO_3$ as base and acetonitrile as the solvent. The detailed synthesis of calix[4]arene-bis-[(4-tert-octyl-benzo)-crown6] ether described below uses $Cs_2CO_3$/acetonitrile and 4-t-octyl-1,2-bis-2'-(2"-iodoethoxy)ethoxybenzene, the synthesis of which is described below in 16A and 16B and depicted in FIG. 1E.

Example 16

Synthesis of Calix[4]arene-bis-[(4-tert-octyl-benzo)-crown-6] ("BoBCalix[4]Crown6")

A. Synthesis of 4-t-octyl-1,2-bis-2'-(2"-chloroethoxy)ethoxybenzene (16A)

Bischloroethyl ether (400 mL, 1.7 mol) obtained from Aldrich Chemical Co. was heated under Argon to 130° C. in a 3-neck, 2 L round-bottom flask equipped with a mechanical stirrer, thermometer and 500 mL addition funnel. A solution of 4-t-octylcatechol (200 g, 0.90 mol) in ambient bischloroethyl ether (400 mL, 1.7 mol) was placed in the addition funnel. Solid $K_2CO_3$ obtained from EM Science, Inc. (75 g, 1.3 mol, finely ground in a ball mill) was added to the flask, followed by 50 mL of the t-octylcatechol/bischloroethyl ether solution. The reaction mixture was stirred at 130° C. for one hour. The addition of $K_2CO_3$ (75 g) and t-octylcatechol/bischloroethyl ether (50 mL) was repeated at 45 minute intervals until all of the $K_2CO_3$ and t-octylcatechol/bischloroethyl ether had been added. A total of eight additions ($K_2CO_3$; 600 g, 10.7 mol) over 5.5 hours were required. The mixture was heated for an additional one hour and allowed to cool to room temperature. The mixture was filtered and the solid washed with low boiling aliphatic petroleum solvent (hexanes or petroleum ether) obtained from EM Science, Inc. The petroleum solvent was removed in vacuo on a rotary evaporator, after which excess bischloroethyl ether (585 g) was recovered by distillation in vacuo on a rotary evaporator. The residue was subjected to vacuum distillation using a short-path distillation head. The product was collected over a temperature range ~100–180° C. @ ~0.200–0.100 mm Hg, with a final heating bath T~250° C. A total of 241 g (61.5%) of product containing predominantly 16A, contaminated with a small amount of bis-t-octylbenzo-18-crown-6, of sufficient purity for use in the subsequent reaction was obtained. The NMR ($^1$H) was consistent with the assigned structure.

B. 4-t-octyl-1,2-bis-2'-(2"-iodoethoxy)ethoxybenzene (16B)

A solution of 16A (240 g, ~0.5 mol) and NaI obtained from EM Science, Inc. (150 g, 1 mol) in acetonitrile (1 L) obtained from EM Science, Inc., was heated at reflux for 3 hours, cooled in an ice bath and filtered. The filtrant was washed with acetonitrile (500 mL) to obtain a solution containing some monochloro, monoiodo-ether but predominantly containing 16B sufficient for use in the next reaction. No spectral or other characterizations other than TLC were performed.

C. Calix[4]arene-bis-[(4-tert-octyl-benzo)-crown-6] (16C)

A suspension of calix[4]arene (106 g, 0.25 mol) synthesized according to the method of Gutsche in *Tetrahedron*, vol. 42, number 6, pp. 1633–1640 (1986), herein incorporated by reference and $Cs_2CO_3$ (41 g, 0.125 mol) Aldrich Chemical Co., in acetonitrile (5 L) was heated with stirring under Argon at 60° C. in a three-neck, 12-L, round-bottom flask equipped with an addition funnel, mechanical stirrer, and reflux condenser until a clear solution was obtained (10–20 minutes). One-half of the dihalide solution described above (~0.25 mol of 16B in 0.75 L of acetonitrile) was added in one portion and the mixture was heated with stirring at reflux. After three hours, additional $Cs_2CO_3$ (41 g, 0.125 mol) was added and the mixture was allowed to reflux for 21 hours. After 24 hours reaction time, TLC analysis indicated that nearly all of the dihalide had been consumed. Additional $Cs_2CO_3$ (41 g, 0.125 mol) and the remainder of the dihalide solution (~0.25 mol of 16B in 0.75 L of acetonitrile) was added and the mixture was refluxed with stirring for 48 hours. An additional portion of dihalide solution 16B (62 g, 0.10 mol) and $Cs_2CO_3$ (41 g, 0.125 mol) were added and heating and stirring were continued for an additional 48 hours. (NOTE: The volume of the reaction mixture was reduced from ~6 L initially to ~3 L over the course of the reaction due to losses of solvent due to evaporation.)

The bulk of the remaining acetonitrile (~2 L) was removed by distillation. Toluene (2 L) and 1 N HCl (1 L)

were added and the mixture was stirred to dissolve the reaction residue. The phases were separated and the aqueous phase was extracted once with toluene (500 mL). The toluene phases were washed sequentially with 1 N HCl (500 mL) and water (500 mL). The combined organic phases were dried over magnesium sulfate, filtered, and evaporated in vacuo to obtain 306 g of reddish-brown sludge.

The residue was subjected to column chromatography on silica gel 60 (5 kg, 60–240 mesh). The column was eluted with 4 L of hexanes followed by 5 L each of 10%, 20%, 30%, and 40% ethyl acetate in hexanes. Elution was continued with 50% ethyl acetate/hexanes until no additional product was observed in the eluent by TLC. Two liter fractions were taken and those containing the desired product (as determined by TLC) were evaporated in vacuo and triturated with warm (~55° C.) acetonitrile to obtain a white precipitate, which, after cooling to ~10° C., was collected by filtration. The total combined solid product 16C (~80 g) was dissolved in warm acetonitrile (1.5 L @ –60° C.) and allowed to cool slowly to room temperature (~5 hours) after which the suspension was placed in an ice-water bath for 4 hours. The suspension was then placed in a freezer at –12° C. for 12 hours. The suspension was filtered and the precipitate washed with 1 L of cold (–12° C.) acetonitrile to obtain ~71 g of white powder, which was dried overnight (18 hours) under vacuum at 75° C. to obtain 60 g of off-white powder. NMR ($^1$H and $^{13}$C) spectra were consistent with the assigned structure. Additional product (5–10 g) could be obtained by chromatography of the combined mother liquors from the trituration of fractions from the column followed by recrystallization from acetonitrile.

Modifiers

Figure 3A:
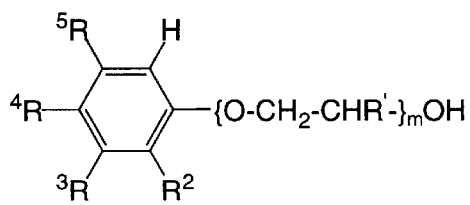
FIG. 3A is a diagram of representative examples of modifiers of the first type shown in FIG. 2.
Figure 3B:
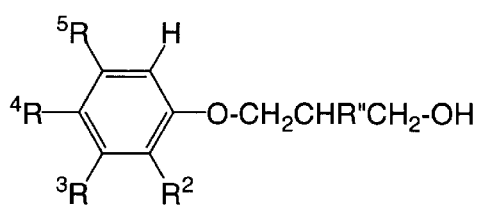
FIG. 3B is a diagram of representative examples of modifiers of the second type shown in FIG. 2.

Modifiers most useful for the present invention fall into the general class of alkyl-substituted phenoxy alcohols, (alkylaryl ether alcohols) as shown in FIG. 2. Two general types are generally described as follows. The first type has a two carbon chain between the phenyl ether oxygen and the hydroxyl (alcohol) oxygen. Representative examples of modifiers of this type have been prepared and tested, and are shown in FIG. 3A. They are also shown as entries A–E in FIG. 4. Additional ether-, alcohol-, or fluorine-containing substituents (the R' group) can be attached to the carbon to which the first alcohol substituent is attached (the "alpha" carbon). The second type of modifier which has three carbons between the phenyl ether and hydroxyl oxygens is also useful. Representative examples of this type that have been prepared and tested, as shown in FIG. 3B and in FIG. 4 as entries F and G.

The specific method for preparing modifiers having a two carbon linkage consists of reacting a suitable alkylated phenol with a mono-substituted epoxide under base-catalyzed ring-opening conditions, as shown schematically in FIG. 5 (Method One). When using more than one epoxide per phenol (m>1) in this reaction, the additional epoxide will add to the alcohol to produce a polyether alcohol. Therefore, it is desirable for no more than two epoxide groups to be added to the phenol (m not more than two), and it is more desirable for there to be only one epoxide group added (m=1). It should be further noted that in base-catalyzed ring opening of an epoxide, the favored reaction is between the phenol oxygen and the less-substituted (or least-hindered) carbon of the epoxide ring. Consequently, the ring opens such that the product phenoxy alcohol has the alcohol attached to the same carbon atom as is the R' group substituent. Here, the R' on the epoxide can be a variety of substituents, including but not limited to —H, —$CH_3$, —$CF_3$, —$CH_2OH$, —$CH_2OCF_2CF_2H$, or —$CH_2OCH_2CF_3$. Accordingly, modifiers B and E where prepared using Method One.

Additional methods of preparing modifiers of this type are known to those skilled in the art. One such method is Method Three of FIG. 5. Here, due to the high reactivity of the epoxide where R'=H (ethylene oxide), there is a tendency for multiple ethylene oxide groups to be added unless stoichiometry is tightly controlled (one ethylene oxide molecule per phenol). However, it is somewhat more convenient to employ Method Three using ethylene carbonates to prepare modifiers where m=1 and R'=H. As such modifiers A, C, and E where prepared using Method Three. Yet another method for preparing modifiers such as A, C, and E is to react the appropriate phenol with a 2-halo-ethanol such as 2-chloro ethanol.

A specific method for preparing the second type of modifiers consists of reacting a suitable alkyl phenol with a 3-halo-propanol (X—$CH_2CH_2CH_2OH$), where the halide group X is preferably chloride or bromide. This is depicted in FIG. 5 as Method Two. Accordingly, modifiers F and G where prepared from 3-chloro-propanol using this method.

In addition to the two above-mentioned types, bifunctional modifiers and various derivatives thereof may also be useful. Hence, it can be readily seen by those skilled in the art of organic synthesis that other aromatic alcohols such as catechols, resorcinols, and bis-phenols will produce corresponding products when reacted with epoxides, ethylene carbonate, or 3-halo-propanol. Examples of such products are shown in FIG. 6. As a note concerning modifiers derived from bis-phenols, it is desirable for the alkyl group which joins the two phenol groups (para to the phenolic —OHs) to possess a total of six or more carbons to confer solubility in aliphatic hydrocarbon diluents.

In any case, representative examples of mono-functional modifiers derived from phenols (entries A–G) shown in FIGS. 3 and 4 have been prepared and tested, although these examples are not to be construed as being inclusive. Alkylphenols suitable for preparing useful modifiers can be selected from the general type shown in FIG. 5, where the alkyl group can be attached to any or all of the positions numbered 2, 3, 4, or 5 on the aromatic ring. These alkyl groups need to be large enough to allow sufficient solubility in aliphatic hydrocarbon diluents, and very low solubility in aqueous solutions. Therefore, the number of carbons collectively attached to the aromatic ring needs to be at least 4, and can be as many as 16, with no one group having less than two carbons. Although the alkyl groups of various carbon lengths can be arranged in any reasonable manner about the ring, they are limited by steric congestion considerations, and as such range from two ethyl (—$CH_2CH_3$) groups attached to any two phenyl ring carbons 2 through 5, to one single 16-carbon aliphatic chain attached to any one of the phenyl ring carbons 2 through 5. For alkyl groups of nine or more carbon atoms in length, it is less desirable for attachment to the aromatic ring to be at the number 2 position.

Therefore, since it is best that modifiers be more aliphatic it is preferred that the aromatic ring contain either one alkyl substituent of six carbon atoms or greater, or two substituents of three carbon atoms or greater. It is more preferred that the aromatic ring contain either one alkyl substituent of eight carbon atoms or greater, or two alkyl substituents of four carbon atoms or greater. These substituents can be either straight chain or branched, though branched are preferred. The manner in which two substituents can be attached to the aromatic ring will again be dictated by steric congestion principles. In general, straight chain (n-alkyl) substituents can be attached to adjacent ring carbons, whereas branched substituents require at least one non-substituted aromatic ring carbon separating the alkyl groups. Hence, branched alkyl substituents are limited to 2,4-, 2,5-, and 3,5-di-substitution (see FIG. 2). It is undesirable to have 2,6-di-substitution, and thus it will not be considered. Where there is one large alkyl chain of eight or more carbons, it more desirable that the group be branched (to reduce undesirable surfactant properties). Here, attachment to position number two of the aromatic ring is less desirable.

It is therefore most preferred that the modifiers be prepared from the combination of alkyl phenols selected from the group 4-tert-octylphenol and 3,5-di-tert-butylphenol with epoxides (under base-catalyzed ring-opening conditions) of the type $CH_2(O)CHR'$ shown in FIG. 5 as Method One, where the substituent $R'=-CH_2OCF_2CF_2H_3$. Accordingly, the most preferred modifier is shown in FIG. 5 as E.

Alternatively, other preferred modifiers may be prepared from the combination of alkyl phenols selected from the group 4-tert-octylphenol, and 3,5-di-tert-butylphenol with 3-halo-propanols $ClCH_2CH_2CH_2OH$ and $BrCH_2CH_2CH_2OH$ as shown in FIG. 5 as Method Two. Modifiers derived from the reaction of 3,5-di-tert-butylphenol with ethylene oxide or ethylene carbonate are also preferred. The resulting modifiers are shown respectively in FIG. 4 as G and F.

Modifier Syntheses

Details of the three synthetic methods employed to prepare modifiers A–G are described below, using modifiers B, E, F, and D as representative examples.

Example 17

Synthesis of 1-(4-tert-octyl-phenoxy)-2-propanol (Modifer B) using Method One (FIG. 5)

A 250 mL 2-neck flask was charged with 20.6 g (0.10 mol) of 4-tert-octylphenol obtained from Aldrich Chemical Co., a catalytic amount of dry, ground potassium carbonate (1.38 g, 0.010 mol) obtained from EM Science, Inc., a stir bar, and 95%. ethanol (70 mL) under argon. The side arm was then stoppered, and a condenser with an argon inlet was attached to the center neck. Stirring was commenced to dissolve the phenol, then cold propylene oxide (8.4 mL, 7.0 g, 0.12 mol) obtained from Aldrich Chemical Co. was added. The reaction was refluxed 3 hours, allowed to cool, and the ethanol was removed by rotary evaporation. The colorless oil was dissolved in 120 mL ethyl ether, and washed twice successively with 5% aqueous sodium hydroxide, followed by water. After drying over anhydrous $MgSO_4$, the ether was evaporated off to give 25.3 g of crude product, which contained about 22 mol % unreacted phenol, and about 7 mol % of the 2-(4-tert-octyl-phenoxy)-1-propanol isomer. The product was purified by dissolving in 100 mL hexanes, and extracting with 4×50 mL 5% NaOH in 15:85 v/v water/methanol. The methanol layers were back-extracted with 50 mL hexanes obtained from EM Science, Inc. The hexanes layers were dried over anhydrous $MgSO_4$, and the hexanes removed under vacuum to afford a combined yield of 13.3 g (50%) of material that contained less than 1% unreacted phenol. The structure of the compound was corroborated by proton ($^1H$) and carbon-13 NMR spectrometry. Proton NMR revealed the material to contain about 7 mol % of the 2-(4-tert-octyl-phenoxy)-1-propanol isomer.

Example 18

Synthesis of 1-(1,1,2,2-tetrafluoroethoxy)-3-(4tert-octylphenoxy)-2-propanol. (Modifer E) using Method One (FIG. 5).

A 250 mL 2-neck flask was charged with 20.6 g (0.10 mol) of 4-tert-octylphenol obtained from Aldrich Chemical Co., a catalytic amount of dry, ground potassium carbonate obtained from EM Science, Inc. (1.38 g, 0.010 mol), a stir bar, and 95% ethanol (75 mL) under argon. The side arm was then stoppered with a rubber septum, and a condenser with an argon inlet was attached to the center neck. The system was evacuated and backflushed with argon three times. Stirring was commenced to dissolve the phenol, then glycidyl 1,1,2,2-tetrafluoroethyl ether (27.0 mL, 19.15 g, 0.11 mol) obtained from Aldrich Chemical Co., was added through the septum in two portions using a 20 mL glass syringe. The reaction was monitored by thin layer chromatography (TLC) while it refluxed for 24 hours in an oil bath at 100° C. The mixture was then allowed to cool and the ethanol removed by rotary evaporation. The product was obtained by dissolving the reaction mixture in 100 mL hexanes and extracting with 1×50 mL 5% NaOH in 15:85 v/v water/methanol followed by 2×50 mL deionized water washes. The methanol-water layers were back-extracted with 50 mL hexanes. After drying over anhydrous $MgSO_4$, the combined hexanes were evaporated off to give 41.0 g (108% yield) of a pale yellow oil. The product was purified by fractional distillation under vacuum with 31.96 g (84%) of spectroscopically pure product being collected at 145–153° C. (0.2 mm Hg). The structure and purity of the compound were corroborated by proton ($^1H$) and carbon-13 NMR spectrometry.

Example 19

Synthesis of 3-(3,5-di-tert-butylphenoxy)-1-propanol (Modifer F) using Method Two (FIG. 5)

A 250 mL 3-neck flask was charged with 20.6 g (0.10 mol) of 3,5-di-tert-butylphenol obtained from Aldrich Chemical Co., an excess amount of dry, ground potassium carbonate (28.0 g, 0.2 mol) obtained from EM Science, Inc., and a stir bar, all under argon. The side arms were then stoppered, and a condenser with an argon inlet was attached to the center neck. Next, 60 mL of argon-sparged acetonitrile was added through the side arm with stirring to dissolve the phenol. Stirring was then stopped while an addition funnel containing 10 mL (0.12 mol) of 3-chloropropanol obtained from Aldrich Chemical Co., dissolved in 20 mL of argon-sparged acetonitrile was added, under positive argon flow. The 3-chloropropanol-acetonitrile mixture was added dropwise over a 15 minute period at a temperature of 50° C. The reaction was refluxed (oil bath at 115° C.) for 26 hrs, after which TLC showed some unreacted phenol. An additional 1.0 mL (0.012 mol) of 3-chloropropanol was added to force the reaction toward more product. The reaction was continued for an additional 2 hrs and then allowed to cool. The light tan liquid was then filtered to remove the potassium carbonate and the excess acetonitrile was removed by rotary evaporation. The remaining oily, yellow liquid was taken up in 100 mL hexanes, and washed twice successively with 5% aqueous sodium hydroxide, followed by water. After drying over anhydrous $MgSO_4$, the hexanes were evaporated off to give 25.50 g of crude product as a pale yellow oil. The crude product was again dissolved in 100 mL of hexanes and washed twice with 40 mL of 5% NaOH in 15% water/85% methanol. After drying over $MgSO_4$, the hexanes were evaporated off to give 20.69 g (78%) of spectroscopically pure product, which solidifies upon standing. The structure and purity of the compound were corroborated by proton ($^1H$) and carbon-13 NMR spectrometry.

Example 20

Synthesis of 2-(2,4-di-tert-butyl-phenoxy)-1-ethanol (Modifer D) using Method Three (FIG. 5)

A 250 mL 2-neck flask was charged with 20.6 g (0.10 mol) of 2,4-di-tert-butylphenol obtained from Aldrich Chemical Co., a catalytic amount of dry, ground potassium carbonate obtained from EM Science, Inc. (1.38 g, 0.010 mol), and a stir bar. The side arm was stoppered, and a condenser with an argon inlet was attached to the center neck. The flask was heated under argon to 130° C. and the first of two portions (6.30 g, 0.071 mol) of ethylene carbonate obtained from Aldrich Chemical Co., was added to the stirred molten mixture. Heating was continued to 160° C. ($CO_2$ was observed to evolve at 150° C.), at which time the remaining ethylene carbonate (3.4 g, 0.039 mol) was added. Heating was continued until a temperature of 182° C. was reached, and stirring at this temperature was continued for an additional 2.5 hours. The pale yellow oily suspension was allowed to cool, taken up in 100 mL ethyl ether, and washed twice successively with 5% aqueous sodium hydroxide, followed by water. After drying over anhydrous $MgSO_4$, the ether was evaporated off to give 24.58 g of crude product as a pale yellow waxy solid. Recrystallizing twice from hot acetonitrile afforded 14.7 g (59%) of spectroscopically pure white crystalline material. The structure and purity of the compound were corroborated by proton ($^1H$) and carbon-13 NMR spectrometry.

Diluents

Aliphatic kerosene diluents are most desirable for use in a solvent extraction process for separation of radionuclides from both alkaline and acidic solutions due to their high chemical and radiolytic stability, low cost, relatively low toxicity, low density and low solubility in water. Hence, an ideal solvent for the present solvent extraction process is composed of $\geq 50\%$ by volume of a normal- or iso-paraffinic kerosene diluent (i.e., linear or branched aliphatic hydrocarbons) of flashpoint $\geq 60°$ C., containing one or more modifiers (which need to be chemically stable, non-toxic, with flash point above 60° C.) at a total concentration $\leq 50$ vol %, and the extractant. The organic and aqueous phases need to be capable of separating ("coalescing") cleanly and rapidly, without the formation of third phases or emulsions, to be suitable for a solvent extraction process employing contacting equipment such as mixer-settlers or centrifugal contactors. In addition, the distribution of cesium to the organic phase needs to be sufficiently high to enable the separation of cesium to be accomplished in a practical number of contacts (it is desirable that the distribution ratio be greater than unity).

Extraction Under Acidic Conditions

The process of the invention was developed especially for the recovery of cesium values from highly alkaline tank waste, in which large amounts of sodium and potassium are present. However, the solvents containing calix-crowns and modifiers as described in the present invention have also been discovered to be useful for extracting cesium from acidic solutions. A solvent comprised of BoBCalix[4] Crown6 at 0.02 M and modifier E, 1-(1,1,2,2-tetrafluoroethoxy)-3-(4-tert-octylphenoxy)-2-propanol at 0.25 M in ISOPAR™ L was contacted with a simple acidic waste simulant containing nitric acid at 1.0 M, sodium nitrate at 5.0 M, potassium nitrate at 0.5 M and cesium nitrate at 30 micromolar. (Acidic wastes of this type are present at DOE's Idaho National Engineering Lab facilities.) The cesium distribution ratio obtained (following the procedure described for example 1 above) was 4.08±0.02, and 92% of the cesium contained in the solvent could be removed following two stripping contacts using water. Similarly, a solvent comprised of BoBCalix[4]Crown6 at 0.01 M and modifier F (3-(3,5-di-tert-butylphenoxy)-1-propanol at 0.50 M in ISOPAR™ L was contacted with a different simple acidic waste simulant containing nitric acid at 1.0 M, sodium nitrate at 1.0 M, and cesium nitrate at 1.0 millimolar. The cesium distribution ratio obtained (following the procedure described for example 1 above) was 1.63, and >99% of the cesium contained in the solvent could be removed following two stripping contacts using 10 millimolar nitric acid.

Extraction of Other Metals

An appropriately formulated embodiment of the present invention, potentially including additional extractants and modifiers, can be used for the combined extraction of technetium (pertechnetate anion) and strontium, as well as cesium from alkaline waste.

Accordingly, it is seen that the present invention provides a composition and process for the separation of cesium from alkaline waste solutions including those which contain large excesses of other alkali metal ions such as sodium and potassium. The present invention further provides a practical alkaline-side cesium extraction process as well as an improved composition and method for extracting cesium from acidic solutions. Additionally, it provides a method and composition for extracting cesium from hydrometallurgical solutions. Moreover, it provides the basis for a composition and process for the clean up of cesium and other metals such as technetium and strontium from nuclear waste sites.

It will be understood that various details of the invention may be changed without departing from the scope of the invention. Furthermore, the forgoing section description is for the purpose of illustration only, and not for the purpose of limitation, since the invention is limited by the claims.

We claim:

1. A composition for extracting cesium from alkaline waste solutions comprising:
   a) an alkane-soluble calix-arene crown ether of formula (I) or (II),

wherein,
  each R may be identical, different, or in any combination thereof,
  each R independently represents singly substituted H, $CH_3$, alkyl, or cycloalkyl, or two Rs attached to adjacent carbon atoms independently represent doubly substituted

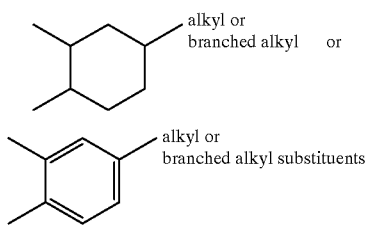

b) an alkylaryl ether alcohol modifier; and
c) a non-polar hydrocarbon diluent.

2. The composition according to claim 1 wherein said alkylaryl ether alcohol is of the formula (III) or (IV):

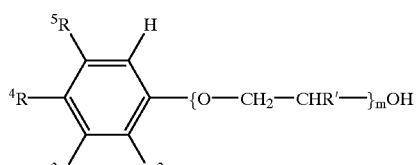

(III)

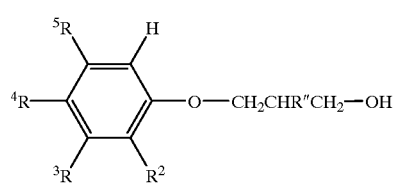

(IV)

wherein, $R^2$, $R^3$, $R^4$, and $R^5$ each independently represent —H, alkyl, or branched alkyl substituents, and may be identical, different, or in any combination thereof;

R'=—H, —CH$_3$, —CF$_3$, —CH$_2$OH, —CH$_2$OCF$_2$CF$_2$H, or —CH$_2$OCH$_2$CF$_3$;

R"=—H, —CH$_3$; and m=1 or 2.

3. The composition according to claim 2 wherein:
$R^2$, $R^3$, and $R^5$=H; and
$R^4$=tert-octyl.

4. The composition according to claim 2 wherein:
$R^2$ and $R^4$=H; and
$R^3$ and $R^5$=tert-butyl.

5. The composition according to claim 1 wherein said alkylaryl ether alcohols comprise 2-(4-t-octylphenoxy)-ethanol; 1-(4-t-octylphenoxy)-2-propanol; 2-(3,5-di-t-butylphenoxy)-ethanol; 2-(2,4-di-t-butylphenoxy)-ethanol; 1-(1,1,2,2-tetrafluoroethoxy)-3-(4-t-octylphenoxy)-2-propanol; 3-(3,5-di-t-butylphenoxy)-1-propanol; or 3-(4-t-octylphenoxy)-1-propanol.

6. The composition according to claim 1 wherein said non-polar hydrocarbon diluent is an aliphatic kerosene.

7. A process for extracting cesium and other metals from alkaline waste solutions comprising the steps of:
contacting a volume of an aqueous feed solution containing cesium with a solvent comprising:
a) an alkane-soluble calix-arene crown ether according to formula (I) or (II),

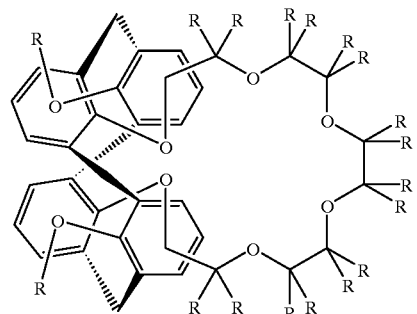

(I)

(II)

wherein, each R may be identical, different, or in any combination thereof, each R independently represents singly substituted H, CH$_3$, alkyl, or cycloalkyl, or two Rs attached to adjacent carbon atoms independently represent doubly substituted

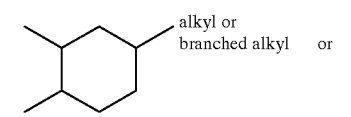

b) a water immiscible organic diluent; and
c) one or more alkylaryl ether alcohol modifiers;
contacting a volume of the solvent obtained above containing the portion of cesium, with a volume of a stripping solution, comprised of pure water or dilute mineral acid having up to a 100 millimolar concentration;
thereby removing the cesium values from said solvent phase into the stripping solution to make the organic solution containing the crown ether and modifier available for reuse.

8. A process according to claim 7 wherein said alkylaryl ether alcohol is selected from the group consisting of formula (III) and formula (IV):

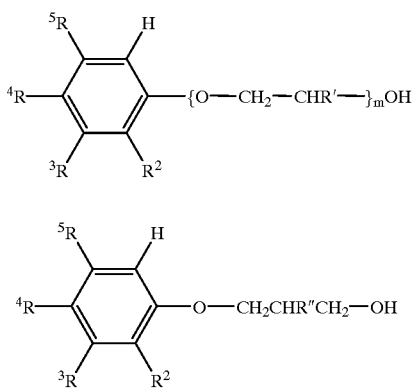

wherein,
R², R³, R⁴, and R⁵ each independently represent —H, alkyl, or branched alkyl substituents, and may be identical, different, or in any combination thereof;
R'=—H, —CH₃, —CF₃, —CH₂OH, —CH₂OCF₂CF₂H, or —CH₂OCH₂CF₃;
R"=—H, —CH₃; and
m=1 or 2.

9. A process according to claim 8 wherein
R², R³, and R⁵=H; and
R⁴=tert-octyl.

10. A process according to claim 9 wherein
R² and R⁴=H; and
R³ and R⁵=tert-butyl.

11. A process according to claim 10 wherein said alkylarylether alcohols comprise 2-(4-t-octylphenoxy)-ethanol; 1-(4-t-octylphenoxy)-2-propanol; 2-(3,5-di-t-butylphenoxy)-ethanol; 2-(2,4-di-t-butylphenoxy)-ethanol; 1-(1,1,2,2,-tetrafluoroethoxy)-3-(4-t-octylphenoxy)-2-propanol; 3-(3,5-di-i-butylphenoxy)-1-propanol; or 3-(4-t-octylphenoxy)-1-propanol.

12. The process according to claim 7 wherein the volume ratio of said aqueous feed solution to said solvent, and the volume ratio of said aqueous stripping solution to said solvent both range from about 0.05 to 20.

13. The process according to claim 7 wherein said dilute mineral acid is nitric acid at a concentration range from about 0.1 to 10 millimolar.

14. The process according to claim 12 wherein said dilute mineral acid further comprises cesium nitrate at a concentration range from about 0.01 to 1.0 millimolar.

15. The process according to claim 7, wherein said alkane-soluble crown ether is Calix[4]arene-(bis-tert-octylbenzo-crown-6) ether at a concentration of between about 0.001 to 0.20 molar, where said organic diluent is aliphatic, and where said modifiers are at a total concentration of between about 0.10 and 1.0 molar.

* * * * *